US011891930B2

(12) United States Patent
Foxhall et al.

(10) Patent No.: US 11,891,930 B2
(45) Date of Patent: Feb. 6, 2024

(54) EXHAUST VALVE ASSEMBLY FOR A TWO-STROKE INTERNAL COMBUSTION ENGINE

(71) Applicant: BRP-ROTAX GMBH & CO. KG, Gunskirchen (AT)

(72) Inventors: Nigel Foxhall, Semriach (AT); Markus Doppelbauer, Gunskirchen (AT); Heinz Kusel, Pennewang (AT); Matthias Zarhuber, Thalheim bei Wels (AT); Roland Kirchberger, Graz (AT); Franz Winkler, Graz (AT); Andrea Abis, Graz (AT)

(73) Assignee: BRP-ROTAX GMBH & CO. KG, Gunskirchen (AT)

( * ) Notice: Subject to any disclaimer, the term of this patent is extended or adjusted under 35 U.S.C. 154(b) by 0 days.

(21) Appl. No.: 17/552,856

(22) Filed: Dec. 16, 2021

(65) Prior Publication Data

US 2022/0178282 A1 Jun. 9, 2022

Related U.S. Application Data

(63) Continuation of application No. 16/766,621, filed as application No. PCT/EP2018/082483 on Nov. 26, 2018, now Pat. No. 11,236,651.

(Continued)

(51) Int. Cl.

*F01M 13/00* (2006.01)
*F01L 7/12* (2006.01)

(Continued)

(52) U.S. Cl.

CPC ............ *F01M 13/0011* (2013.01); *F01L 7/12* (2013.01); *F01L 7/16* (2013.01); *F01M 2013/0044* (2013.01); *F02B 2075/025* (2013.01)

(58) Field of Classification Search

CPC ....... F01M 13/0011; F01M 2013/0044; F01M 13/00; F01L 7/12; F01L 7/16; F02B 2075/025

See application file for complete search history.

(56) References Cited

U.S. PATENT DOCUMENTS 2,403,844 A 7/1946 Bolli
4,285,311 A 8/1981 Iio (Continued)

FOREIGN PATENT DOCUMENTS

DE 3712750 A1 11/1988
DE 4028757 A1 8/1991

(Continued)

OTHER PUBLICATIONS

International Search Report of PCT/EP2018/082483; Thierry Klinger; dated Feb. 12, 2019.

(Continued)

*Primary Examiner* — Jacob M Amick
*Assistant Examiner* — Charles J Brauch
(74) *Attorney, Agent, or Firm* — BCF LLP

(57) ABSTRACT

A method of operating an exhaust valve of a two-stroke internal combustion engine is disclosed. The engine has a cylinder and a piston movably disposed within the cylinder. The cylinder defines at least one exhaust port for discharging exhaust fluid from the cylinder. The exhaust valve is configured to cyclically obstruct the exhaust port. The method includes: rotating the exhaust valve in a first direction for clearing the exhaust port before the piston uncovers the exhaust port during a downstroke of the piston, the first direction being opposite a direction of rotation of a crankshaft of the engine; and rotating the exhaust valve in the first direction for at least partially closing the exhaust port before the piston fully covers the exhaust port during an upstroke (Continued)

of the piston, said rotating of the exhaust valve relative to the rotation of the crankshaft at least partially counterbalancing the crankshaft.

5 Claims, 27 Drawing Sheets

Related U.S. Application Data

(60) Provisional application No. 62/590,414, filed on Nov. 24, 2017.

(51) Int. Cl.
*F01L 7/16* (2006.01)
*F02B 75/02* (2006.01)

(56) References Cited

U.S. PATENT DOCUMENTS

| | | | | |
|---|---|---|---|---|
| 4,354,459 | A | 10/1982 | Maxey | |
| 4,368,703 | A | 1/1983 | Shibata | |
| 4,924,819 | A | 5/1990 | Boyesen | |
| 4,995,354 | A | 2/1991 | Morikawa | |
| 5,111,778 | A | 5/1992 | Huang | |
| 5,267,535 | A | 12/1993 | Luo | |
| 5,273,004 | A | 12/1993 | Duret et al. | |
| 5,315,962 | A | 5/1994 | Renault et al. | |
| 5,417,188 | A | 5/1995 | Schiattino | |
| 8,578,895 | B2 | 11/2013 | Baldini | |
| 8,997,701 | B2 | 4/2015 | Hooper et al. | |
| 2003/0230258 | A1 | 12/2003 | Niemiz | |
| 2013/0327306 | A1 * | 12/2013 | Hooper | F02B 75/02 123/65 R |

FOREIGN PATENT DOCUMENTS

| | | | |
|---|---|---|---|
| DE | 102015224061 | A1 | 6/2017 |
| FR | 1013563 | A | 7/1952 |
| GB | 2117047 | A | 10/1983 |
| JP | S5744717 | A | 3/1982 |
| JP | S6357815 | A | 3/1988 |
| JP | H04179813 | A | 6/1992 |
| JP | H1182081 | A | 3/1999 |
| JP | H11182252 | A | 7/1999 |
| JP | 2003193843 | A | 7/2003 |
| WO | 2012013715 | A1 | 2/2012 |

OTHER PUBLICATIONS

English translation of DE102015224061A1 retrieved from https://patents.google.com/patent/DE102015224061A1/en?oq=DE102015224061 on May 21, 2020.

English translation of FR1013563A retrieved from http://translationportal.epo.org/ on May 21, 2020.

English translation of JPH04179813A retrieved from http://translationportal.epo.org/ on May 21, 2020.

Nglish translation of JPS5744717A retrieved from http://translationportal.epo.org/ on May 21, 2020.

English translation of DE4028757A1 retrieved from https://patents.google.com/patent/DE4028757A1/en?oq=DE4028757 on May 21, 2020.

English translation of JP2003193843A retrieved from https://patents.google.com/patent/JP2003193843A/en?oq=JP2003193843 on May 21, 2020.

English translation of JPH1182081A retrieved from https://patents.google.com/patent/JPH1182081A/en?oq=JPH1182081A on May 21, 2020.

English translation of JPH11182252A retrieved from https://patents.google.com/patent/JPH11182252A/en?oq=JPH11182252 on May 21, 2020.

English translation of DE3712750A1 retrieved from https://patents.google.com/patent/DE3712750A1/en?oq=DE3712750A1 on May 21, 2020.

English translation of JPS6357815A retrieved from http://translationportal.epo.org/ on May 22, 2020.

Borghi et al., "Design and experimental development of a compact and efficient range extender engine", Applied Energy 202, 2017, pp. 507-526.

Engine Balance, May 17, 2020, retrieved from https://en.wikipedia.org/wiki/Engine_balance#Inherent_balance on May 21, 2020.

* cited by examiner

EXHAUST VALVE ASSEMBLY FOR A TWO-STROKE INTERNAL COMBUSTION ENGINE

CROSS-REFERENCE

The present application is a continuation of U.S. patent application Ser. No. 16/766,621, filed on May 22, 2020, which is a national phase entry of International Patent Application No. PCT/EP2018/082483, filed on Nov. 26, 2018, which claims priority to U.S. Provisional Patent Application No. 62/590,414, filed on Nov. 24, 2017, the entirety of each of which is incorporated herein by reference.

FIELD OF TECHNOLOGY

The present technology relates to exhaust valve assemblies for two-stroke internal combustion engines.

BACKGROUND

In two-stroke engines, the reciprocal movement of a piston inside a cylinder opens and closes an exhaust port through which exhaust fluids are expelled from the cylinder. However, when fuel is introduced into the cylinder's combustion chamber, the piston does not fully cover the exhaust port such that a portion of the fuel may flow out of the cylinder through the exhaust port thus resulting in a significant loss of fuel and, moreover, in harmful emissions.

To address this problem, a tuned exhaust pipe is typically connected to the exhaust port in order to generate back pressure which prevents non-combusted fuel from being expelled through the exhaust port. However, such tuned exhaust pipes are functional at a particular load range of the engine (i.e., a speed range of the engine) and therefore non-combusted fuel may still be lost when the engine operates outside of that load range.

There is therefore a desire for a two-stroke engine that can control the opening and closing of the exhaust port by means other than the piston alone.

SUMMARY

It is an object of the present technology to ameliorate at least some of the inconveniences present in the prior art.

According to one aspect of the present technology, there is provided a two-stroke internal combustion engine. The engine has a crankcase and a crankshaft disposed at least in part in the crankcase. The engine also has a cylinder block connected to the crankcase. A cylinder is defined in the cylinder block and has a cylinder axis. The cylinder defines at least one exhaust port for discharging exhaust fluid from the cylinder. The engine also has a piston movably disposed within the cylinder and which is operatively connected to the crankshaft. The piston is movable along the cylinder axis in a reciprocating motion including an upstroke and a downstroke. The engine also has an exhaust valve assembly operatively connected to and rotatable with the crankshaft. The exhaust valve assembly has a shaft rotatably supported by the cylinder block and extending along a central axis, and a valve connected to the shaft and configured to cyclically obstruct the exhaust port. The valve is operable to: move clear of the exhaust port before the piston uncovers the exhaust port during the downstroke of the piston, and at least partially close the exhaust port before the piston fully covers the exhaust port during the upstroke of the piston.

In some implementations of the present technology, the valve has an inner surface and an outer surface. The inner surface of the valve has a cross-sectional profile taken along a plane normal to the central axis. The cross-sectional profile of the inner surface of the valve has a generally triangular shape defined by two sides of the inner surface converging at an apex.

In some implementations of the present technology, an angle formed between the two sides of the inner surface is at least 120°.

In some implementations of the present technology, the angle formed between the two sides of the inner surface is between 140° and 150°.

In some implementations of the present technology, the outer surface of the valve is saddle-shaped.

In some implementations of the present technology, the outer surface of the valve defines an axial curvature of the valve. The axial curvature has a radius that is greater than a radius of the cylinder.

In some implementations of the present technology, the axial curvature of the valve defines an arcuate axis. When the outer surface of the valve faces the cylinder, the arcuate axis is offset from the cylinder axis in a plane normal to the cylinder axis and containing the central axis.

In some implementations of the present technology, the valve has two ends opposite one another in a direction of the central axis. The shaft has web portions adjacent each end of the valve. The exhaust valve assembly also has a plurality of sealing rings mounted concentrically to the web portions of the shaft.

In some implementations of the present technology, the web portions of the shaft define a maximum diameter of the shaft.

In some implementations of the present technology, at least one of the web portions of the shaft has a plurality of annular grooves configured to receive a corresponding plurality of sealing rings of the plurality of sealing rings.

In some implementations of the present technology, each sealing ring of the plurality of sealing rings has a first end and a second end. Each sealing ring of the plurality of sealing rings defines a gap that extends between the first and second ends thereof. The gaps of adjacent ones of the plurality of sealing rings are circumferentially offset from one another.

In some implementations of the present technology, each sealing ring of the plurality of sealing rings has a peripheral surface in contact with the cylinder block.

In some implementations of the present technology, the shaft and the valve of the exhaust valve assembly are integral with one another such as to form a one-piece component.

In some implementations of the present technology, the engine has a cooling jacket casing and a valve cooling jacket. The valve cooling jacket is configured to contain coolant. The valve cooling jacket being defined between the housing and the cooling jacket casing.

In some implementations of the present technology, the engine has a cylinder cooling jacket configured to contain coolant. The cylinder cooling jacket is fluidly connected with the valve cooling jacket.

In some implementations of the present technology, the exhaust valve assembly has a weighted member configured to counterbalance moving masses of the engine. The weighted member is mounted to an end portion of the shaft and rotatable with the shaft.

In some implementations of the present technology, at least part of the exhaust valve assembly is enclosed within a housing defined at least in part by the cylinder block.

In some implementations of the present technology, the weighted member is enclosed within a chamber defined by the housing.

In some implementations of the present technology, the weighted member is a first weighted member. The exhaust valve assembly has a second weighted member positioned at an opposite end portion of the shaft.

In some implementations of the present technology, the exhaust valve assembly has a venting system configured to vent blow-by gas. At least a portion of the venting system is integrated in the shaft.

In some implementations of the present technology, the venting system includes a radial bore defined by the weighted member and an axial bore defined by the shaft and extending from an end of the shaft. The radial bore of the weighted member is fluidly connected to the axial bore of the shaft.

In some implementations of the present technology, the exhaust port is a single exhaust port of the cylinder.

In some implementations of the present technology, the exhaust port has an upper edge and a lower edge opposite the upper edge. The valve closes the exhaust port from the upper edge of the exhaust port toward the lower edge of the exhaust port.

In some implementations of the present technology, the cylinder is a first cylinder and the exhaust port is a first exhaust port. The cylinder block defines a second cylinder having a second cylinder axis. The second cylinder defines a second exhaust port for discharging exhaust fluid from the second cylinder. The engine has a second piston movably disposed within the second cylinder. The second piston is movable along the second cylinder axis in a reciprocating motion including an upstroke and a downstroke. The valve is a first valve. The exhaust valve assembly has a second valve connected to the shaft and configured to cyclically obstruct the second exhaust port. The valve is operable to: move clear of the second exhaust port before the second piston uncovers the second exhaust port during the downstroke of the second piston, and at least partially close the second exhaust port before the second piston fully covers the second exhaust port during the upstroke of the second piston.

In some implementations of the present technology, the shaft of the exhaust valve assembly comprises a first end portion, a second end portion and an intermediate portion between the first and second end portions. The first valve is located between the first end portion of the shaft and the intermediate portion of the shaft. The second valve is located between the second end portion of the shaft and the intermediate end portion of the shaft. The intermediate portion of the shaft is positioned laterally between the first and second cylinders. The first and second end portions of the shaft are rotatably supported by the cylinder block. The intermediate portion of the shaft is unsupported by the cylinder block.

In some implementations of the present technology, a rotational speed of the exhaust valve assembly is equal to a rotational speed of the crankshaft of the engine.

In some implementations of the present technology, a rotational speed of the exhaust valve device is half of a rotational speed of the crankshaft of the engine.

In some implementations of the present technology, the exhaust valve assembly rotates in a direction opposite to a direction of rotation of the crankshaft.

In some implementations of the present technology, the engine has a plurality of gears operatively connecting the crankshaft to the shaft of the exhaust valve assembly for driving the shaft of the exhaust valve assembly from the crankshaft.

In some implementations of the present technology, the exhaust valve assembly rotates continuously during operation of the engine.

In some implementations of the present technology, the exhaust port has an upper edge and a lower edge opposite the upper edge. During the upstroke of the piston, the piston and the valve close the exhaust port together before the piston reaches the upper edge of the exhaust port.

In some implementations, the exhaust port has an upper edge and a lower edge opposite the upper edge. During the downstroke of the piston, as the piston moves away from the upper edge of the exhaust port, the valve does not obstruct the space between the upper edge of the exhaust port and the piston.

According to another aspect of the present technology, there is provided an exhaust valve assembly for a two-stroke internal combustion engine. The engine has a cylinder block defining a cylinder and a piston movably disposed within the cylinder. The cylinder defines an exhaust port for discharging exhaust fluids from the cylinder. The exhaust valve assembly has a shaft configured to be rotatably supported by the cylinder block of the engine. The shaft extends along a central axis. The exhaust valve assembly also has a valve connected to the shaft and configured to cyclically obstruct the exhaust port of the cylinder. The valve has an inner surface and an outer surface. The inner surface of the valve has a cross-sectional profile taken along a plane normal to the central axis. The cross-sectional profile of the inner surface of the valve has a generally triangular shape defined by two sides of the inner surface converging at an apex.

According to another aspect of the present technology, there is provided a method of operating an exhaust valve of a two-stroke internal combustion engine. The engine has a cylinder and a piston movably disposed within the cylinder. The piston is movable along a cylinder axis of the cylinder in a reciprocation motion including an upstroke and a downstroke. The cylinder has at least one exhaust port for discharging exhaust fluid from the cylinder. The exhaust valve is configured to cyclically obstruct the exhaust port. The method includes: rotating the exhaust valve in a first direction for clearing the exhaust port before the piston uncovers the exhaust port during the downstroke of the piston, the first direction being opposite a direction of rotation of a crankshaft of the engine; and rotating the exhaust valve in the first direction for at least partially closing the exhaust port before the piston fully covers the exhaust port during the upstroke of the piston.

In some implementations of the present technology, the valve closes the exhaust port from an upper edge of the exhaust port toward a lower edge of the exhaust port.

In some implementations of the present technology, the exhaust valve is continuously rotating during operation of the engine.

In some implementations of the present technology, a rotational speed of the exhaust valve is equal to a rotational speed of the crankshaft.

In some implementations of the present technology, a rotational speed of the exhaust valve is half of a rotational speed of the crankshaft.

In some implementations of the present technology, said rotating of the exhaust valve relative to the rotation of the crankshaft at least partially counterbalances the crankshaft.

Implementations of the present technology each have at least one of the above-mentioned object and/or aspects, but do not necessarily have all of them. It should be understood that some aspects of the present technology that have resulted from attempting to attain the above-mentioned object may not satisfy this object and/or may satisfy other objects not specifically recited herein.

Additional and/or alternative features, aspects and advantages of implementations of the present technology will become apparent from the following description, the accompanying drawings and the appended claims.

BRIEF DESCRIPTION OF THE DRAWINGS

For a better understanding of the present technology, as well as other aspects and further features thereof, reference is made to the following description which is to be used in conjunction with the accompanying drawings, where.

DETAILED DESCRIPTION

The present technology will be described below with respect to a direct fuel injection, two-stroke, inline, two-cylinder internal combustion engine. It is contemplated that at least some aspects of the present technology could be provided on a two-stroke internal combustion engine that is carbureted or has semi-direct injection, that has cylinders arranged in a V-type or other arrangement, and/or that has only one or more than two cylinders.

Figure 1:
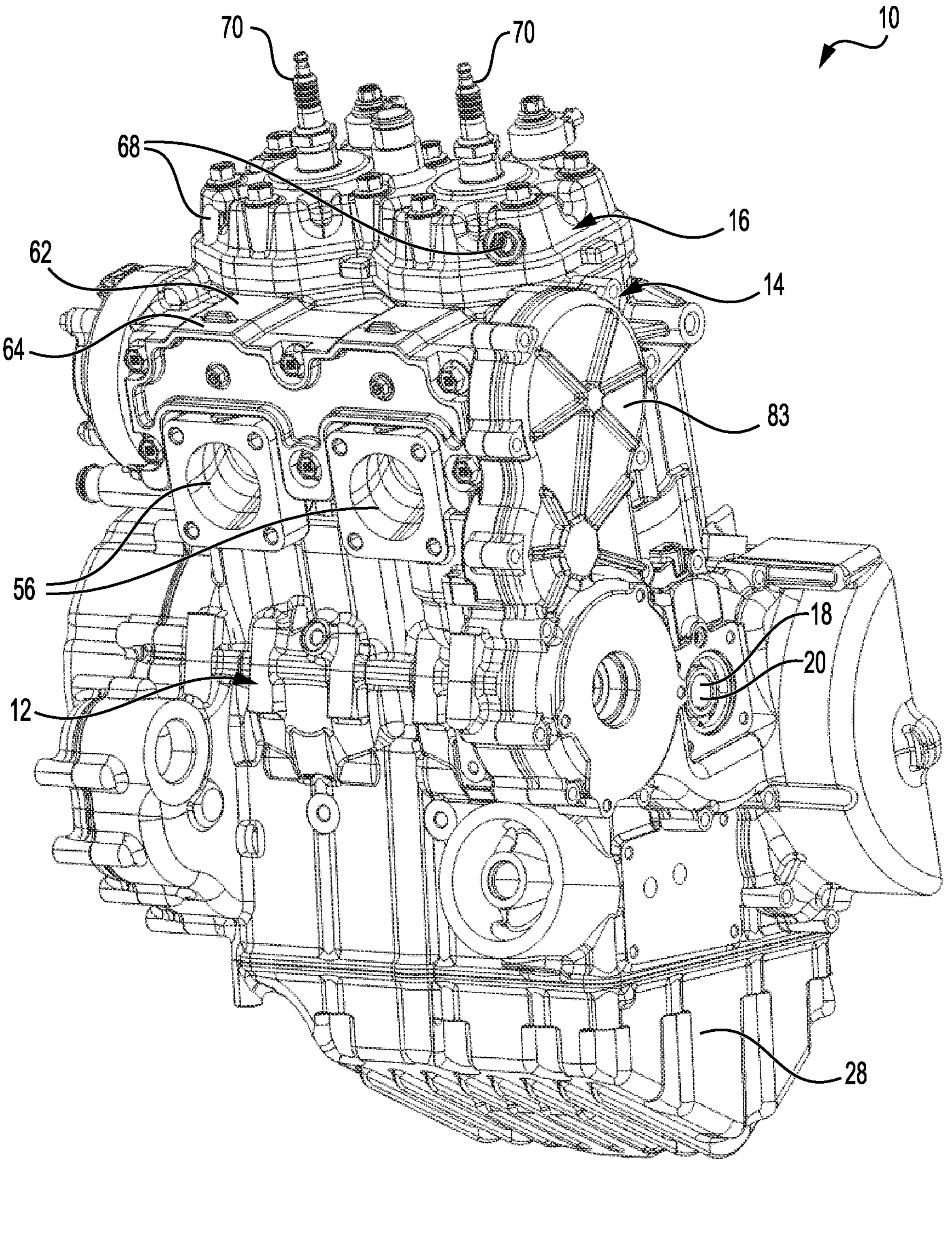
FIG. 1 is a front perspective view of a two-stroke internal combustion engine.
Figure 2:
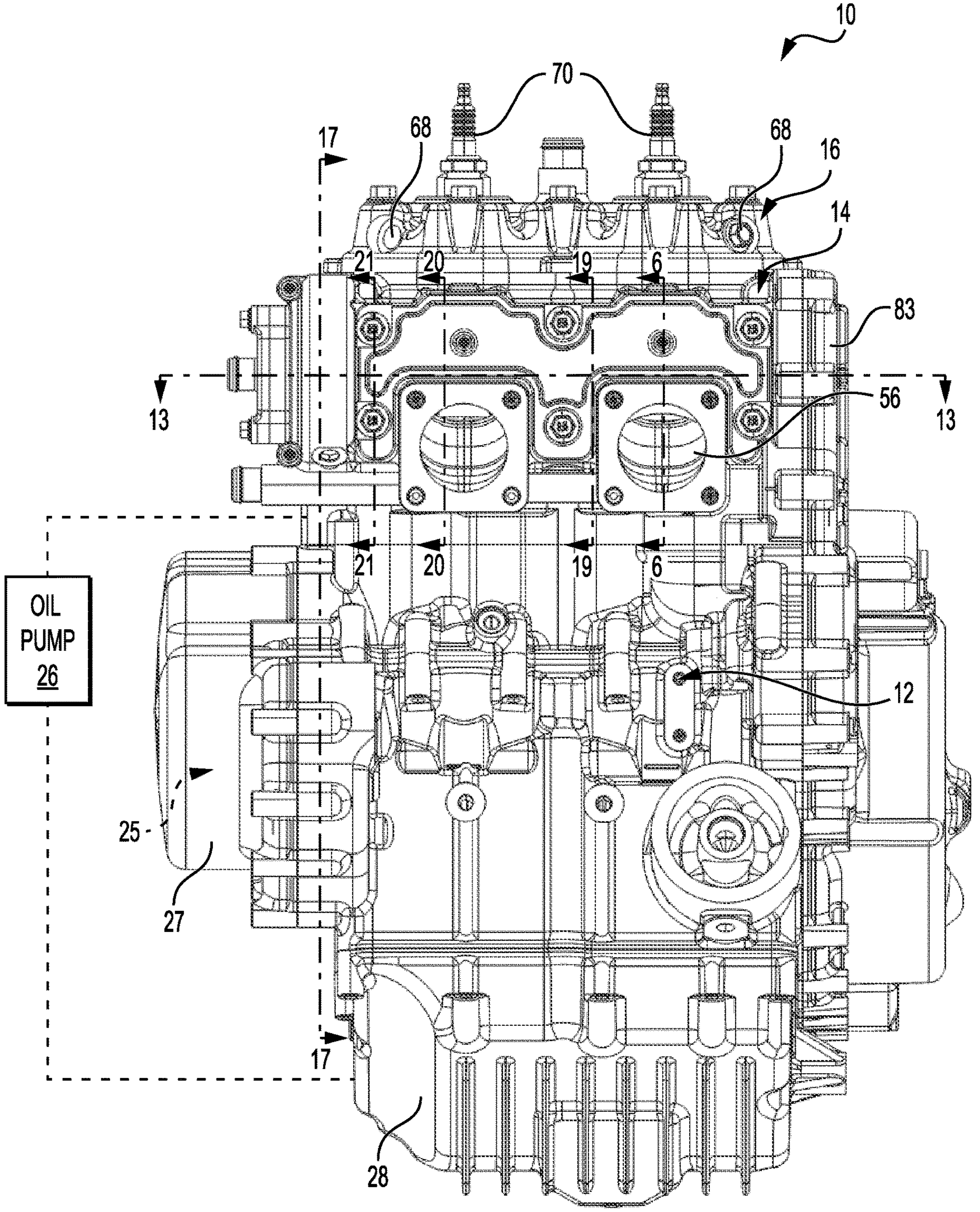
FIG. 2 is a front elevation view of the engine of FIG. 1.
Figure 3:
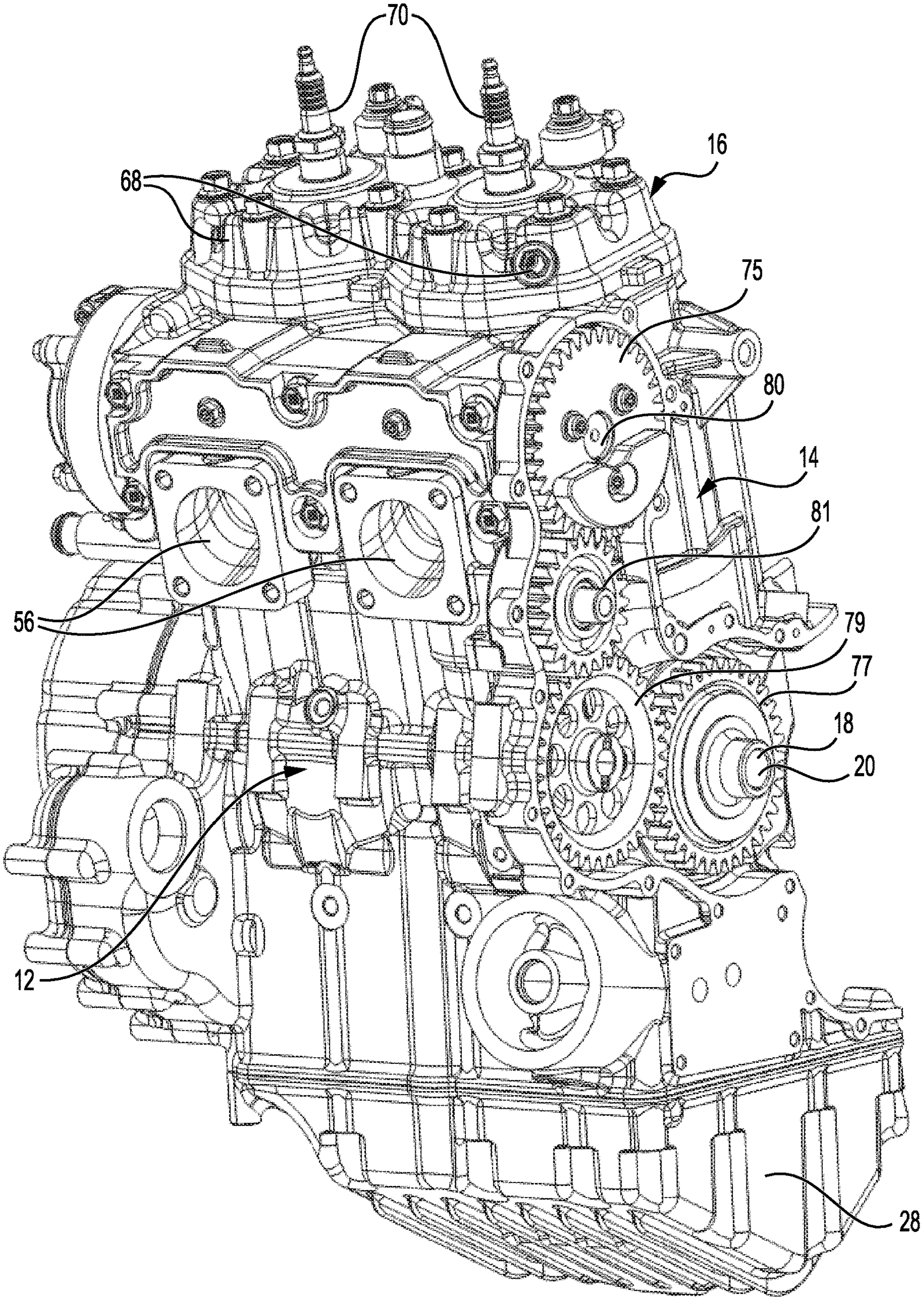
FIG. 3 is a front perspective view of the engine of FIG. 1 with a cover member removed to expose a driving member of an exhaust valve assembly of the engine.

FIGS. 1 to 3 illustrate an internal combustion engine 10. The engine 10 operates on a two-stroke engine cycle such that the engine 10 completes a power cycle with two strokes (an upstroke and a downstroke) of the engine's piston(s). The engine 10 can thus be referred to as a two-stroke engine. The engine 10 has a crankcase 12, a cylinder block 14 connected on top of the crankcase 12 and a cylinder head 16 connected on top of the cylinder block 14.

The crankcase 12 rotationally supports a crankshaft 18. The crankshaft 18 has a portion disposed inside the crankcase 12 and an end 20 extending outside the crankcase 12. The end 20 of the crankshaft 18 connects to a transmission of a vehicle or another mechanical component to be driven by the engine 10. As such, the side of the engine 10 from which the end 20 of the crankshaft 18 protrudes is referred to herein as the power take-off side of the engine 10. It is contemplated that the crankshaft 18 may not have the end 20 protruding from the crankcase 12 and that instead the engine 10 could have another shaft, called output shaft, rotationally supported by the crankcase 12 and driven by the crankshaft 18. In such an implementation, it is the output shaft that protrudes from the crankcase 12 and is connected to the mechanical component to be driven by the engine 10. It is contemplated that the output shaft could be coaxial with or offset from the crankshaft 18.

A generator 25 is connected to the side of the crankcase 12 opposite the power take-off side. The generator 25 uses power produced by the engine 10 to generate electrical energy for storage in a battery (not shown). A generator housing 27 encloses the generator 25 therein. An electric starter motor (not shown) is also connected to the side of the crankcase 12. The starter motor selectively engages the crankshaft 18 via gears (not shown) to cause the crankshaft 18 to turn before the engine 10 can run on its own as a result of the internal combustion process in order to start the engine 10.

An oil pump 26 (schematically shown in FIG. 2) is fluidly connected to various parts of the engine 10 to circulate oil through the engine 10. The oil pump 26 pumps oil from an oil reservoir 28 connected to a bottom of the crankcase 12. The oil pumped by the oil pump 26 is distributed to the various components of the engine 10 that need lubrication. The oil then falls back by gravity inside the oil reservoir 28.

Figure 5:
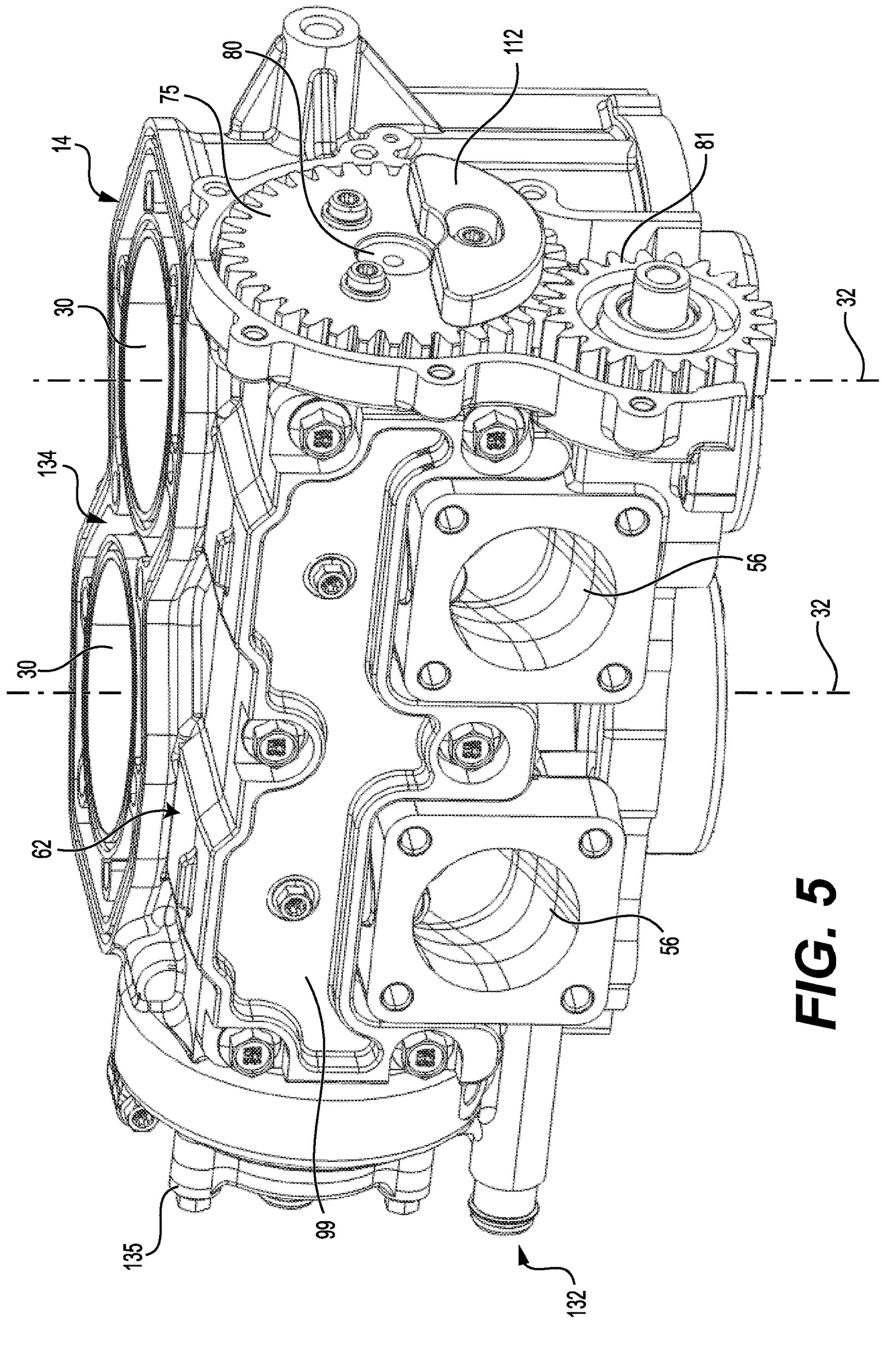
FIG. 5 is a front perspective view of a cylinder block and associated components of the engine of FIG. 1.

As shown in FIG. 5, the cylinder block 14 defines two cylinders 30 adjacent to one another in a lateral direction of the engine 10. Each cylinder 30 defines a cylinder axis 32 along which the cylinder 30 extends. The engine 10 has two pistons 34 each of which is disposed within a corresponding one of the cylinders 30. During operation of the engine 10, each piston 34 moves along the cylinder axis 32 of its corresponding cylinder 30 in a reciprocating motion including an upstroke (whereby the piston 34 moves toward an upper end of the cylinder 30) and a downstroke (whereby the piston 34 moves away from the upper end of the cylinder 30). Each piston 34 is connected to the crankshaft 18 by a connecting rod (not shown) so as to rotate the crankshaft 18 during the upstroke and downstroke of the piston 34.

Figure 6:
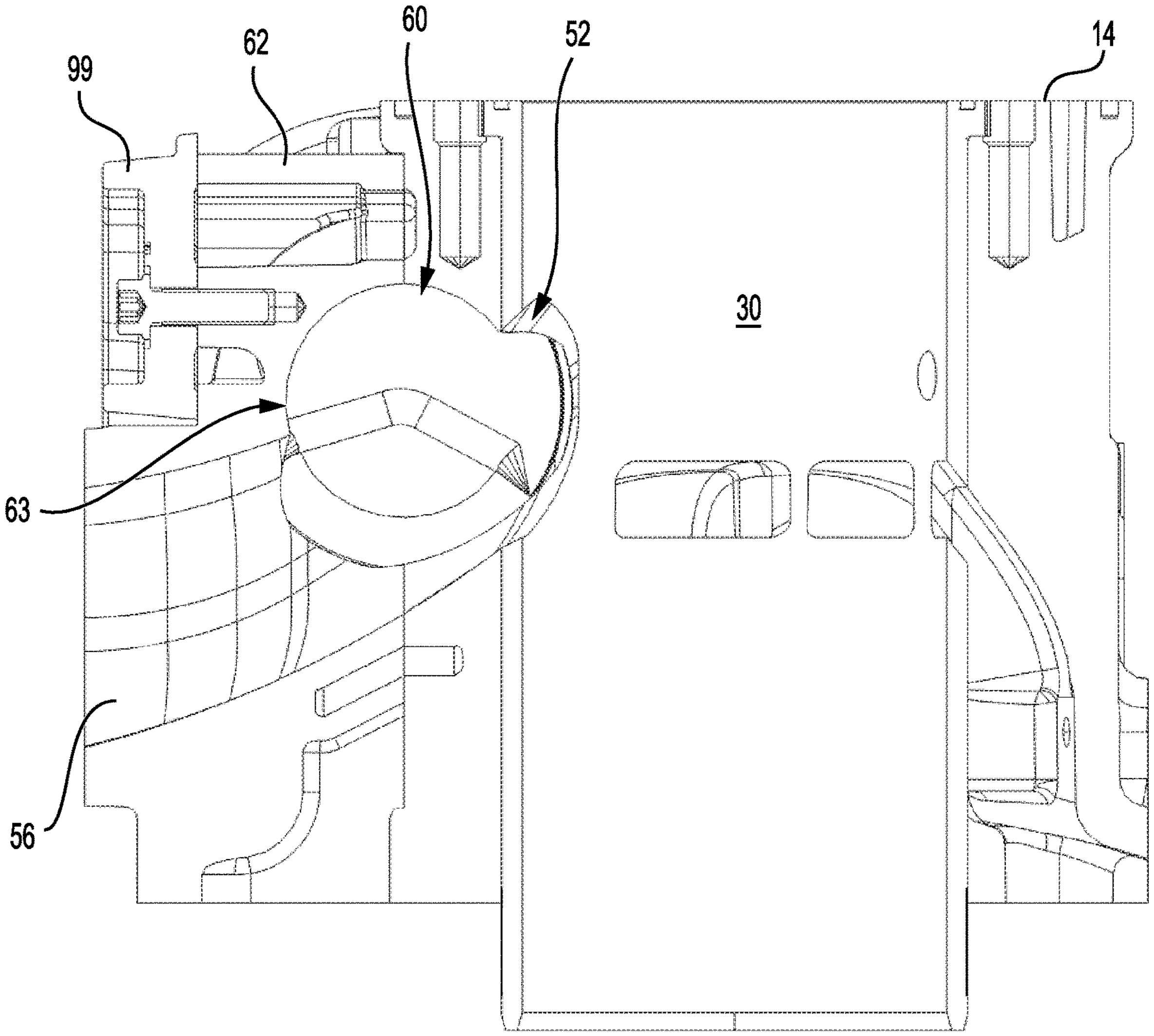
FIG. 6 is a cross-sectional view of the cylinder block of FIG. 4 taken through line 6-6 of FIG. 2, with a piston of the engine removed for clarity.
Figure 8:
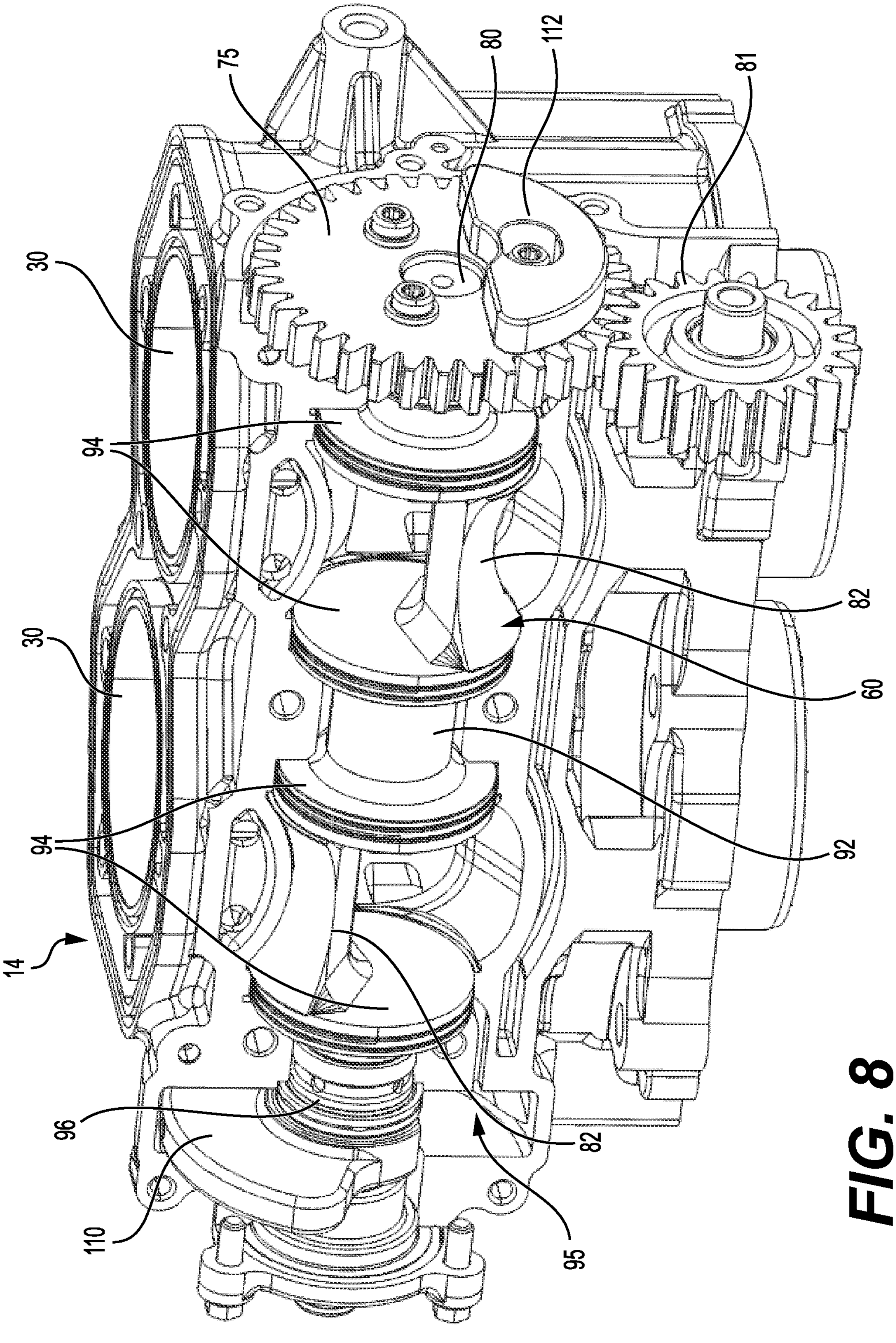
FIG. 8 is a perspective view of the components of FIG. 5 with a cover member removed to expose the exhaust valve assembly of the engine.
Figure 9:
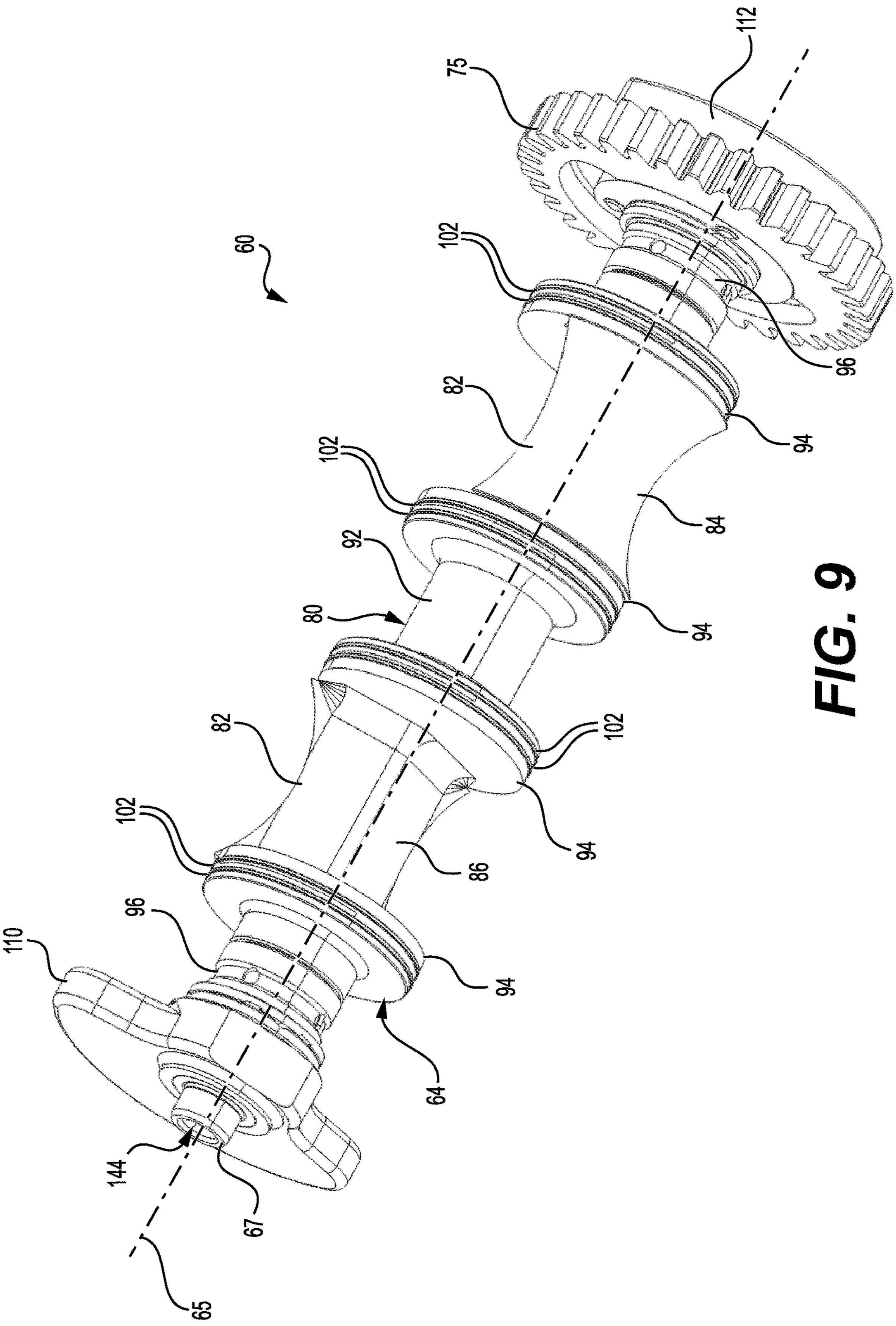
FIG. 9 is a bottom, right side perspective view of the exhaust valve assembly of FIG. 8.

With reference to FIG. 6, each cylinder 30 defines an exhaust port 52 for discharging exhaust fluids from the cylinder 30. Moreover, the cylinder block 14 defines part of an exhaust passage 56 for each cylinder 30 extending from a corresponding one of the exhaust ports 52. As will be described in more detail below, and as more clearly shown in FIG. 8, the engine 10 has an exhaust valve assembly 60 configured to control the opening and closing of the exhaust ports 52 of the cylinders 30 such as to allow or impede passage of exhaust fluids from the cylinders 30 to the exhaust passages 56. The exhaust valve assembly 60 is enclosed between a cover member 62 and the cylinder block 14 which together define a housing 63 within which the exhaust valve assembly 60 is at least partly contained. In this implementation, the cover member 62 also defines part of the exhaust passages 56 in connection with the portion of the exhaust passages 56 defined by the cylinder block 14.

In this implementation, the exhaust port 52 is a single exhaust port of the cylinder 30 in that the cylinder 30 does not have any other exhaust ports. However, it is contemplated that, in alternative implementations, each cylinder 30 could define auxiliary exhaust ports that fluidly communicate with the exhaust passage 56. For example, such auxiliary exhaust ports could be disposed on either side of the exhaust port 52. It is also contemplated that each cylinder could have only one or more than two auxiliary exhaust ports.

An exhaust manifold (not shown) is connected to the cylinder block 14 at the exhaust passages 56. Notably, the exhaust manifold has two inlets in alignment with the two exhaust passages 56 and a single outlet.

The cylinder head 16 closes the tops of the cylinders 30 such that for each cylinder 30 a variable volume combustion chamber is defined between the cylinder 30, its corresponding piston 34 and the cylinder head 16. As can be seen in FIG. 1, two fuel injectors 68 and two spark plugs 70 (one of each per cylinder 30) are connected to the cylinder head 16. The fuel injectors 68 inject fuel directly in the combustion chambers. The spark plugs 70 ignite the fuel-air mixture in the combustion chambers.

Figure 7:
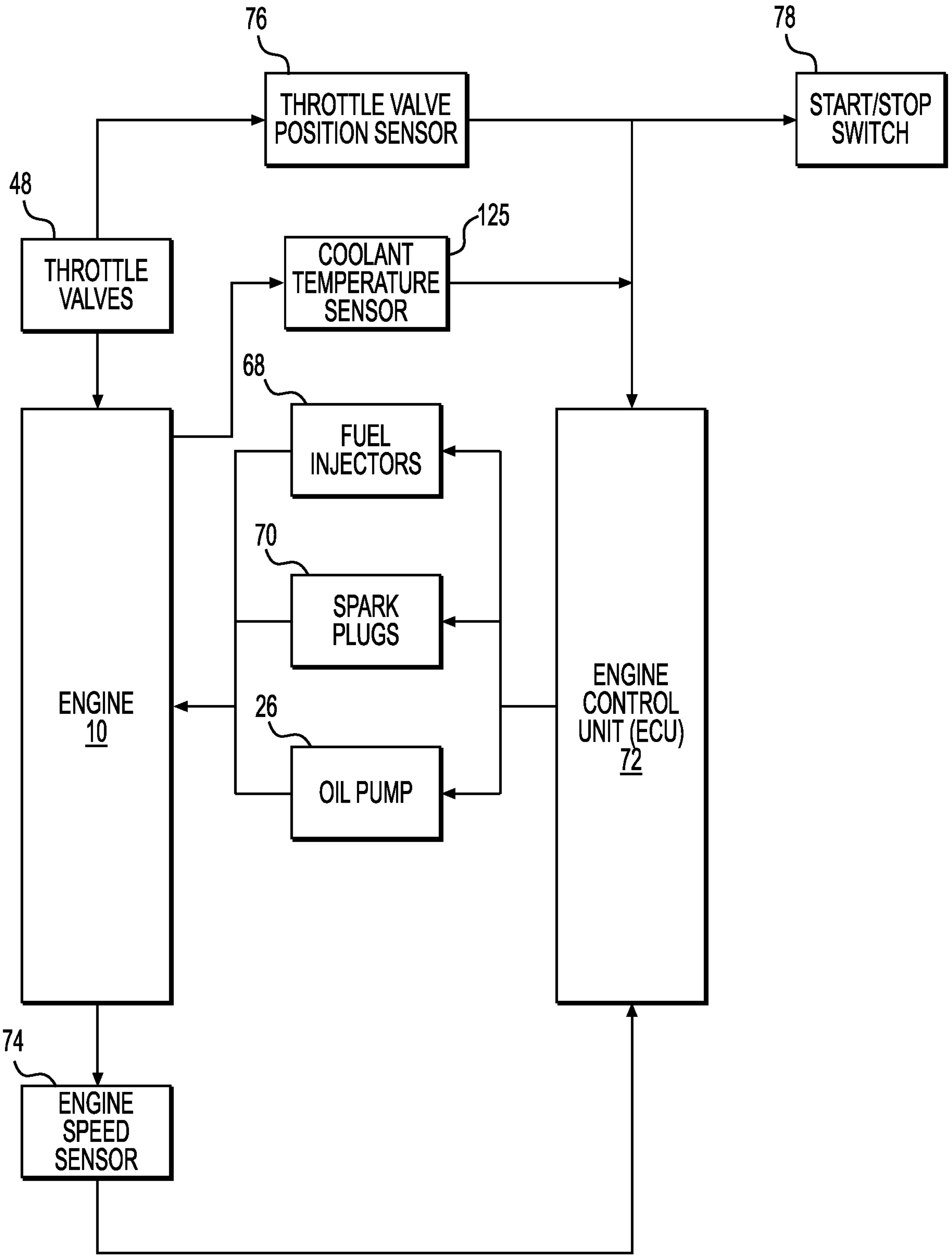
FIG. 7 is a schematic illustration of components of the engine of FIG. 1 and of associated components thereof.

The operation of the fuel injectors 68, the spark plugs 70, the starter motor 24 and the oil pump 26 is controlled by an electronic control unit (ECU) 72 that is schematically illustrated in FIG. 7. The ECU 72 controls these components based on signals received from various sensors and components, some of which are illustrated schematically in FIG. 7. An engine speed sensor 74 senses a speed of rotation of the crankshaft 18 and sends a signal representative of engine speed to the ECU 72. A throttle valve position sensor 76 senses the position of a throttle valve 48 associated with the cylinders 30 and configured to regulate the flow of air into the engine 10. It is contemplated that the engine 10 could include more than one throttle valve 48 in alternative implementations. The throttle valve position sensor 76 sends a signal representative of the position of the throttle valve 48 to the ECU 72. A start/stop switch 78 sends a signal to the ECU 72 to start the engine 10 when the engine 10 is stopped and to stop the engine 10 when the engine 10 is running. It is contemplated that the start/stop switch 78 could be separated into a start switch and a separate stop switch. It is contemplated that the start/stop switch 78 could be incorporated into an ignition key assembly or could be a separate button. A coolant temperature sensor 125 senses a temperature of a coolant flowing in a cooling jacket of the engine 10 and sends a signal representative of the coolant temperature to the ECU 72.

Although a single ECU 72 is illustrated, it is contemplated that the various functions of the ECU 72 could be split between two or more control units/controllers and that at least some of these control units could communicate with each other.

The exhaust valve assembly 60 and the manner in which it functions to control the passage of fluids through the exhaust ports 52 of the cylinders 30 will now be described in more detail with reference to FIGS. 9 to 13.

Figure 11:
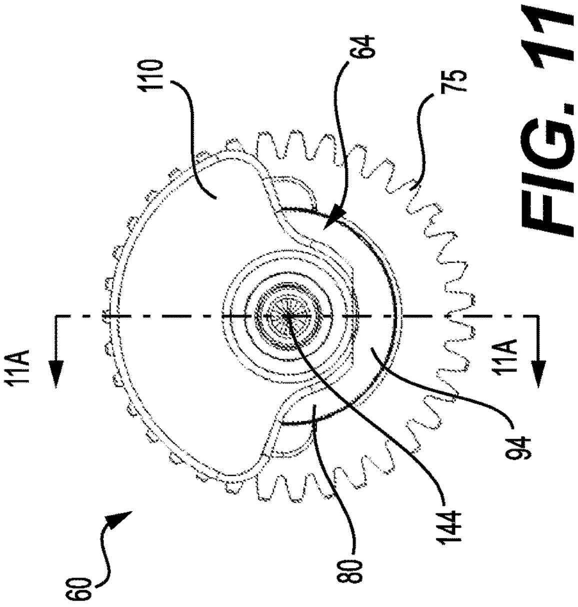
FIG. 11 is a right side elevation view of the exhaust valve assembly of FIG. 9.

The exhaust valve assembly 60 has a rotary valve structure 64 extending along a central axis 65 and having opposite ends 66, 67. The rotary valve structure 64 includes a discontinuous shaft 80 and two valves 82 (one for each cylinder 30) configured to control the flow of fluids through the exhaust ports 52 of the cylinders 30. As best seen in FIG. 11, the shaft 80 and the valves 82 are integrally built with one another such that the rotary valve structure 64 is a one-piece component. In other words, the shaft 80 and the valves 82 are made of a same continuous material.

Figure 11A:
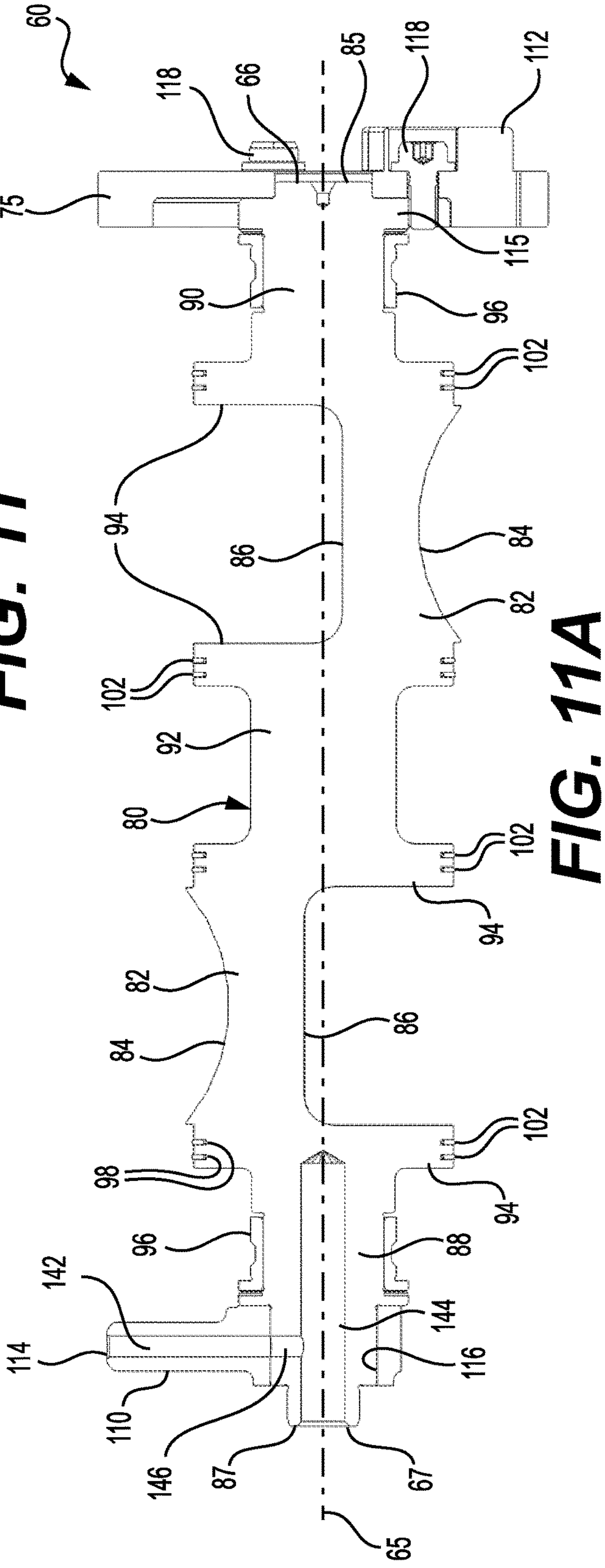
FIG. 11A is a cross-sectional view of the exhaust valve assembly of FIG. 11 taken through line 11A-11A of FIG. 11.

The shaft 80 is supported by the housing 63 to allow the rotary valve structure 64 to rotate relative to the cylinder block 14. The shaft 80 is "discontinuous" in that its different functional portions are separated by the valves 82. Notably, as best seen in FIG. 11A, the shaft 80 includes two end portions 88, 90 defined between the ends 85, 87 of the shaft 80 (which correspond to the ends 66, 67 of the rotary valve structure 64) and the valves 82. The end portions 88, 90 are rotatably supported by the housing 63 via bearings 96 which allow the rotary valve structure 64 to rotate relative to the housing 63. The bearings 96 also transfer heat from the shaft 80 to the housing 63. In this implementation, the bearings 96 are plain bearings and, more particularly, flanged plain bearings. However, it is contemplated that, in alternative implementations, the bearings 96 may be roller bearings or any other suitable type of bearings.

The shaft 80 also has an intermediate portion 92 located between the end portions 88, 90. More specifically, the intermediate portion 92 is located between and connects the valves 82. The portions 88, 90 and 92 are concentric. Due to the design of the rotary valve structure 64 and the manner in which it is supported by the housing 63, the bending moment generated at the intermediate portion 92 is null or otherwise negligible. As such, the intermediate portion 92 is unsupported by the housing 63 and floats freely between the cylinder block 14 and the cover member 62. As such, there is no bearing mounted to the intermediate portion 92. This may facilitate maintenance as the absence of a bearing at the intermediate portion 92 makes it unnecessary to lubricate the intermediate portion 92 of the shaft 80 which would require sealing the intermediate portion 92 to prevent lubricant (e.g., oil) from leaking into the cylinders 30 or draining the lubricant at the intermediate portion 92.

The shaft 80 also has web portions 94 configured to seal the shaft 80 from fluids incoming from the cylinders 30. The web portions 94 are located on both ends of each valve 82 such that a pair of the web portions 94 sandwiches each valve 82 therebetween. The portion 92 of the shaft 80 is located between and connected to the two web portions 94 located between the portion 92 and the valves 82. One of the web portions 94 is located between and connected to one of the valves 82 and the end portion 88 of the shaft 80. Another one of the web portions 94 is located between and connected to one of the valves 82 and the end portion 90 of the shaft 80. Furthermore, the web portions 94 define a maximum diameter of the shaft 80 such that a diameter of each of the web portions 94 is greater than a diameter of the end portions 88, 90 and greater than a diameter of the intermediate portion 92. In this implementation, each web portion 94 has a pair of annular grooves 98 extending circumferentially along a periphery of the web portion 94. Fewer ones of the web portions 94 may have the annular grooves 98 in other implementations (e.g., at least one of the web portions 94 may have the annular grooves 98). As will be described in detail below, each groove 98 is configured to receive therein a sealing ring 102.

Figure 14:
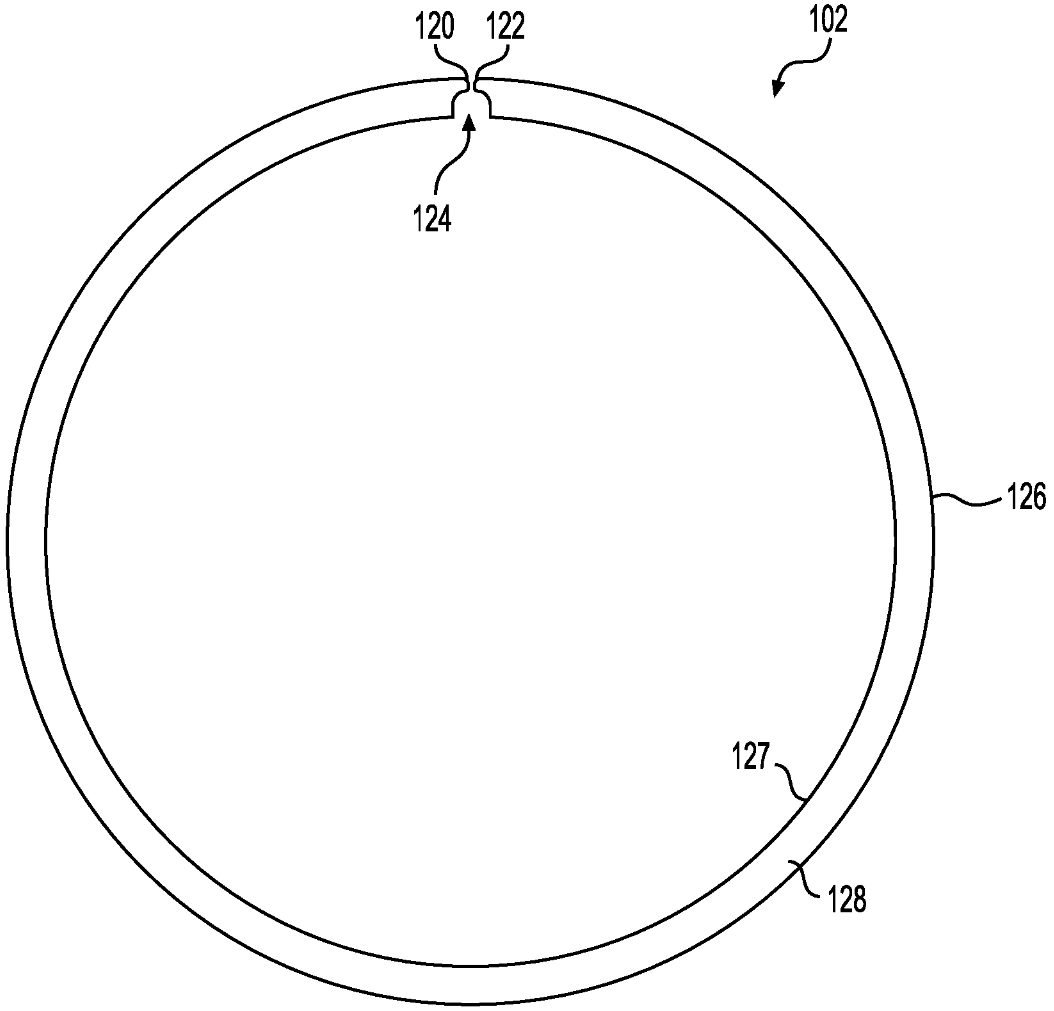
FIG. 14 is a side elevation view of a sealing ring of the exhaust valve assembly.

In particular, the exhaust valve assembly 60 has a plurality of sealing rings 102 which are mountable to the web portions 94 in the grooves 98 thereof. The sealing rings 102 are configured to provide a seal between the web portions 94 of the shaft 80 and the housing 63. Notably, each web portion 94 and the sealing rings 102 mounted thereto form a tortuous path that is difficult for exhaust gases to travel through, thus preventing or otherwise minimizing leakage of exhaust fluids therethrough. As shown in FIG. 14 for one of the sealing rings 102, the sealing rings 102 are split rings, each sealing ring 102 having two ends 120, 122 defining a gap 124 therebetween. Moreover, each sealing ring 102 has an outer peripheral surface 126 and an inner peripheral surface 127 which, when mounted to the web portions 94, respectively face the housing 63 and the rotary valve structure 64. When two of the sealing rings 102 are mounted adjacent to one another on a given one of the web portions 94, the sealing rings 102 are positioned such that their respective gaps 124 are circumferentially offset from one another (i.e., unaligned with respect to one another). In use, a left annular surface 128 and a right annular surface (not shown) of each sealing ring 102 may come into contact with the side surfaces of the grooves 98 which are normal to the central axis 65. Furthermore, in use, the outer peripheral surfaces 126 of the sealing rings 102 are in contact with the cylinder block 14 and the cover member 62 while the inner peripheral surfaces 127 of the sealing rings 102 are spaced from a bottom surface of the grooves 98. As such, the sealing rings 102 are fixed (i.e., do not rotate) relative to the housing 63 while the rotary valve structure 64 rotates relative to the sealing rings 102. The contact between the sealing rings 102 and the housing 63 help transfer heat from the shaft 80 to the housing 63.

The sealing rings 102 can be mounted to the web portions 94 of the shaft 80 relatively easily. Notably, as the outer diameter of the end portions 88, 90 is smaller than an inner diameter of the sealing rings 102, the sealing rings 102 can be slipped over the end portions 88, 90 and mounted to the web portions 94 adjacent to the end portions 88, 90. The sealing rings 102 can be mounted to the web portions 94 adjacent to the intermediate portion 92 by first pulling the ends 120, 122 of a given sealing ring 102 away from one another to widen the gap 124, slipping the sealing ring 102 over the adjacent valve 82 and mounting it to the desired web portion 94. In one implementation, the sealing rings 102 have a structure identical or similar to a piston ring and can be installed with a piston ring installation tool.

It is contemplated that not all the web portions 94 may be configured to be fitted with the sealing rings 102. For instance, in some implementations, inner ones of the web portions 94, adjacent to the intermediate portion 92 of the shaft 80, may be devoid of the sealing rings 102. It is also contemplated that only one or more than two sealing rings 102 could be provided on each web portion 94, or on the outer web portion 94.

Figure 12:
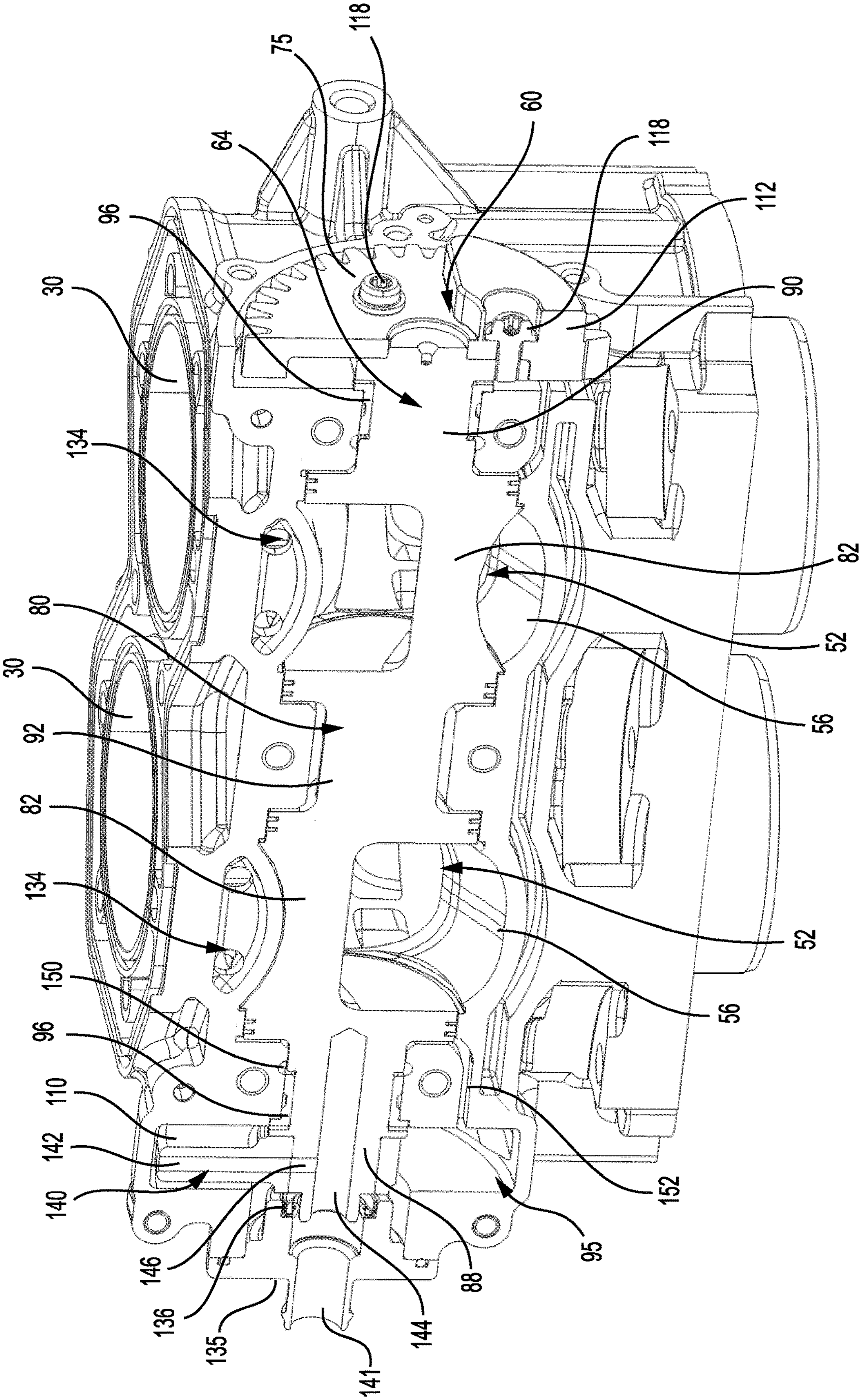
FIG. 12 is a front, left perspective view of the cylinder block of FIG. 8 with a central sectional cut of the exhaust valve assembly mounted thereto.

As can be seen in FIG. 12, the shaft 80 is enclosed at the end portion 88 by a cover 135. The cover 135 has a bore 141 extending axially along a length of the cover 135. The end 87 of the shaft 80 is rotatably mounted to the cover 135. In particular, the shaft 80 is mounted to the cover 135 via a seal 136 disposed between an outer surface of the shaft 80 and an inner surface of the bore 141. As such, shaft 80 rotates relative to the cover 135.

As mentioned above, the valves 82 of the rotary valve structure 64 allow or impede flow of fluids through the exhaust ports 52 and to the exhaust passages 56. Moreover, the valves 82 affect the flow of fluids passing through the exhaust passages 56. The valves 82 are axially spaced apart by the intermediate portion 92 of the shaft 80 and are circumferentially offset (i.e., phased) from one another by 180°. That is, the valves 82 are on opposite sides (i.e., opposite circumferential halves) of the central axis 65. The valves 82 thus extend along a limited portion of a circumference of the rotary valve structure 64. It is contemplated that, in alternative implementations in which the engine 10 has more cylinders 30 (and/or more exhaust ports 52) and thus the rotary valve structure 64 has a corresponding greater number of valves 82, the valves 82 may be offset from one another by a different angular distance (e.g., 120° for a three cylinder engine). In the present implementation, the valves 82 are identical to one another and therefore the below description of a valve relative to its corresponding cylinder 30 applies to both valves 82.

Figure 15:
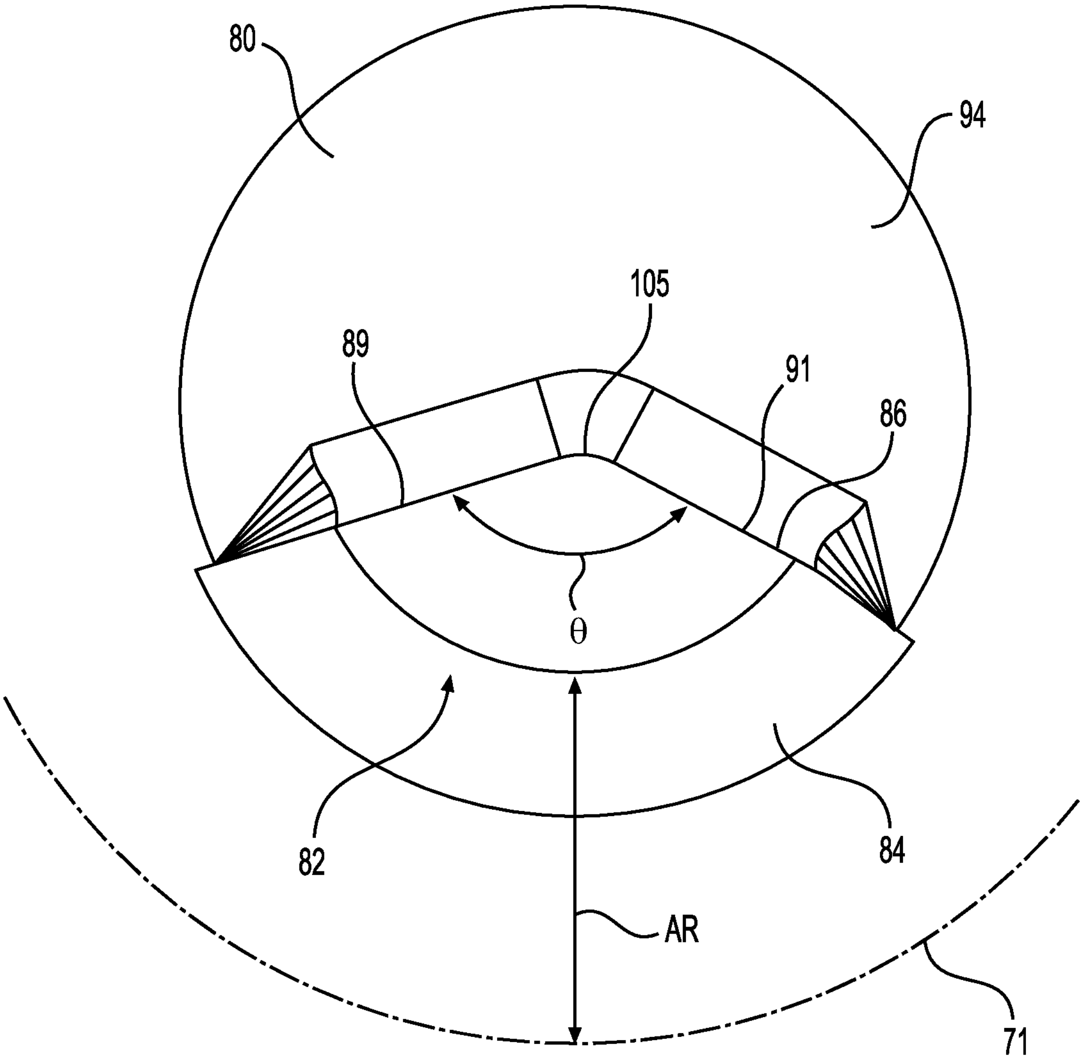
FIG. 15 is a cross-sectional view of a rotary valve structure of the exhaust valve assembly taken along line 15-15 of FIG. 10.
Figure 16:
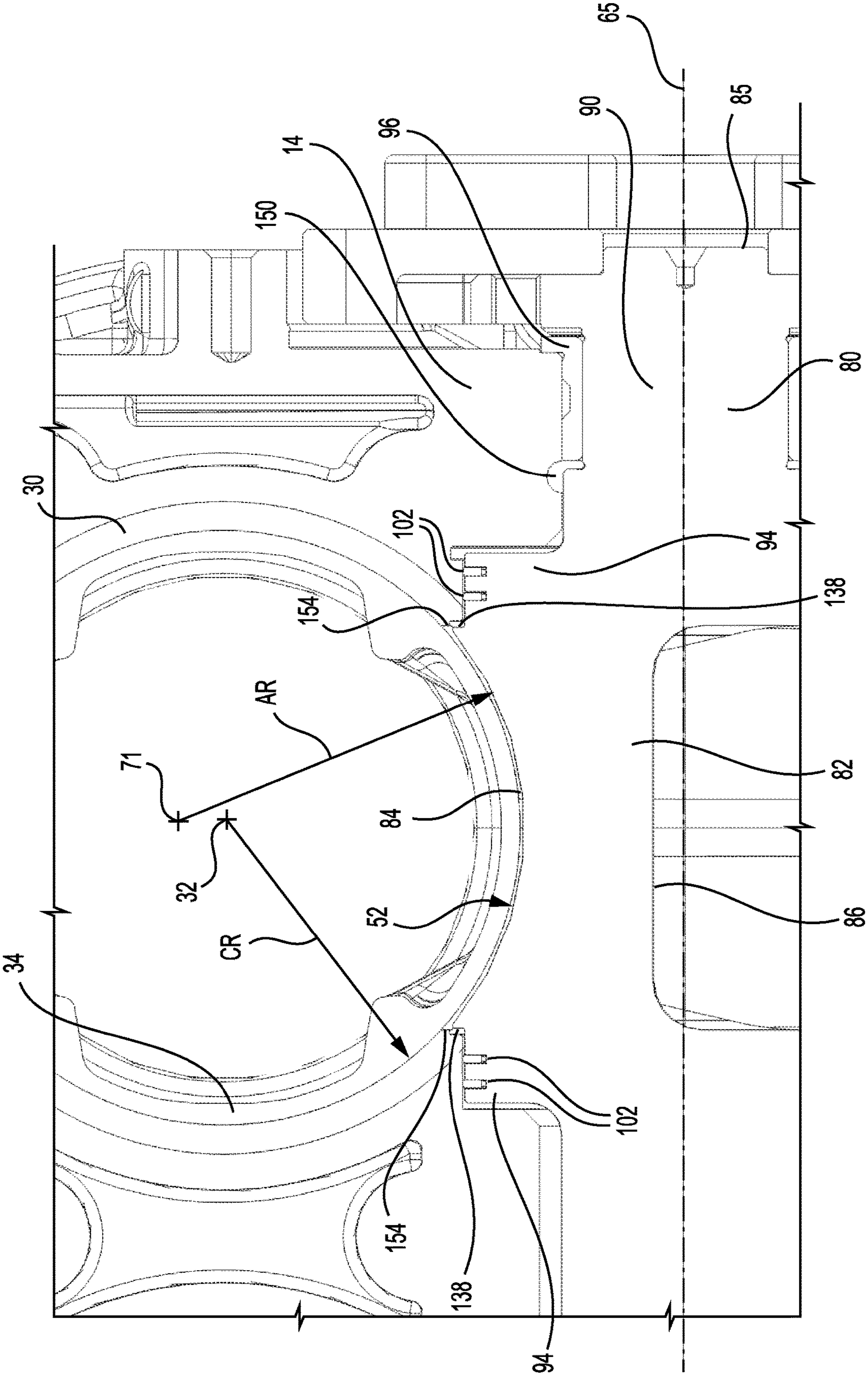
FIG. 16 is a close-up view of a portion of the cross-section of the engine shown in FIG. 13.

Each valve 82 has an outer surface 84 and an inner surface 86 opposite the outer surface 84. The outer surface 84 of the valve 82 is saddle-shaped to accommodate the curved shape of the piston 34. More specifically, with reference to FIGS. 10 and 15, the outer surface 84 defines an axial curvature of the valve 82 having an axial radius AR which is measured between the outer surface 84 and an arcuate axis 71. The arcuate axis 71 is centered about the central axis 65 of the rotary valve structure 64 and extends at the middle of a length of the valve 82 defined between the adjacent web portions 94 such that the arcuate axis 71 bisects the length of the valve 82. As can be seen in FIG. 16, the axial radius AR is greater than a radius CR of the cylinder 30. Moreover, when the outer surface 84 faces the cylinder 30, the arcuate axis 71 is offset from the cylinder axis 32 of the cylinder 32 in a cross-section of the engine 10 taken along a plane normal to the cylinder axis 32 and containing the central axis 65, as shown in FIG. 16. More particularly, in this position, the arcuate axis 71 is located further from the outer surface 84 of the valve than the cylinder axis 32. As such, when the piston 34 passes the exhaust port 52, a clearance between the piston 34 and the outer surface 84 of the valve 82 is smaller at the middle of the length of the valve 82 (i.e., midway of the valve 82) than at the ends of the valve 82. In other words, when the piston 34 passes the exhaust port 52, the clearance between the piston 34 and the outer surface 84 of the valve 82 is smaller at a middle of a lateral length of the exhaust port 52 (i.e., midway of the exhaust port 52 in the lateral direction of the engine 10) than at the lateral ends 154 of the exhaust port 52. This may allow some axial displacement of the rotary valve structure 64 relative to the cylinder block 14.

In this implementation, as best seen in FIG. 16, the ends 138 of the valve 82 extend radially past the web portions 94. As such, the valve 82 defines a point of the rotary valve structure 64 that is furthest from the central axis 65. This may be helpful to improve a seal between the valve 82 and the housing 63 to prevent fluids from leaking axially past the valve 82. It is contemplated that the ends 138 of the valve 82 could be flush with the web portions 94, thereby simplifying the manufacturing of the exhaust valve assembly 60.

Turning back to FIG. 15, the inner surface 86 of the valve 82 includes a first portion 89 and a second portion 91. The first portion 89 of the inner surface 86 extends along a first plane that is transversal to a second plane along which the second portion 91 extends. The first and second portions 89, 91 converge radially toward one another to form an apex 105 of the inner surface 86 therebetween. As such, in a cross-section of the valve 82 taken along a plane normal to the central axis 65 of the rotary valve structure 64, as shown in FIG. 15, a cross-sectional profile of the inner surface 86 of the valve 82 is generally triangular and includes two sides (corresponding to the portions 89, 91 of the inner surface 86) transversal to one another and converging at the apex 105. As shown in FIG. 15, the apex 105 defines an angle θ measured from the first portion 89 to the second portion 91. The angle θ may be at least 120°, in some cases at least 130°, in some cases at least 140°, in some cases at least 145° and in some cases even more. For example, the angle θ may be between 140° to 150°. In this implementation, the angle θ is 145°. This shape of the inner surface 86 may improve flow of the exhaust fluids from the cylinder 30 as the exhaust fluids flow through the exhaust passage 56 along the inner surface 86 of the valve 82 upon exiting through the exhaust port 52 compared to if the inner surface 86 were a flat surface. Notably, an effective flow area of the exhaust fluids as they flow through the exhaust passage 56 may be greater than if the inner surface 86 were flat.

Figure 4:
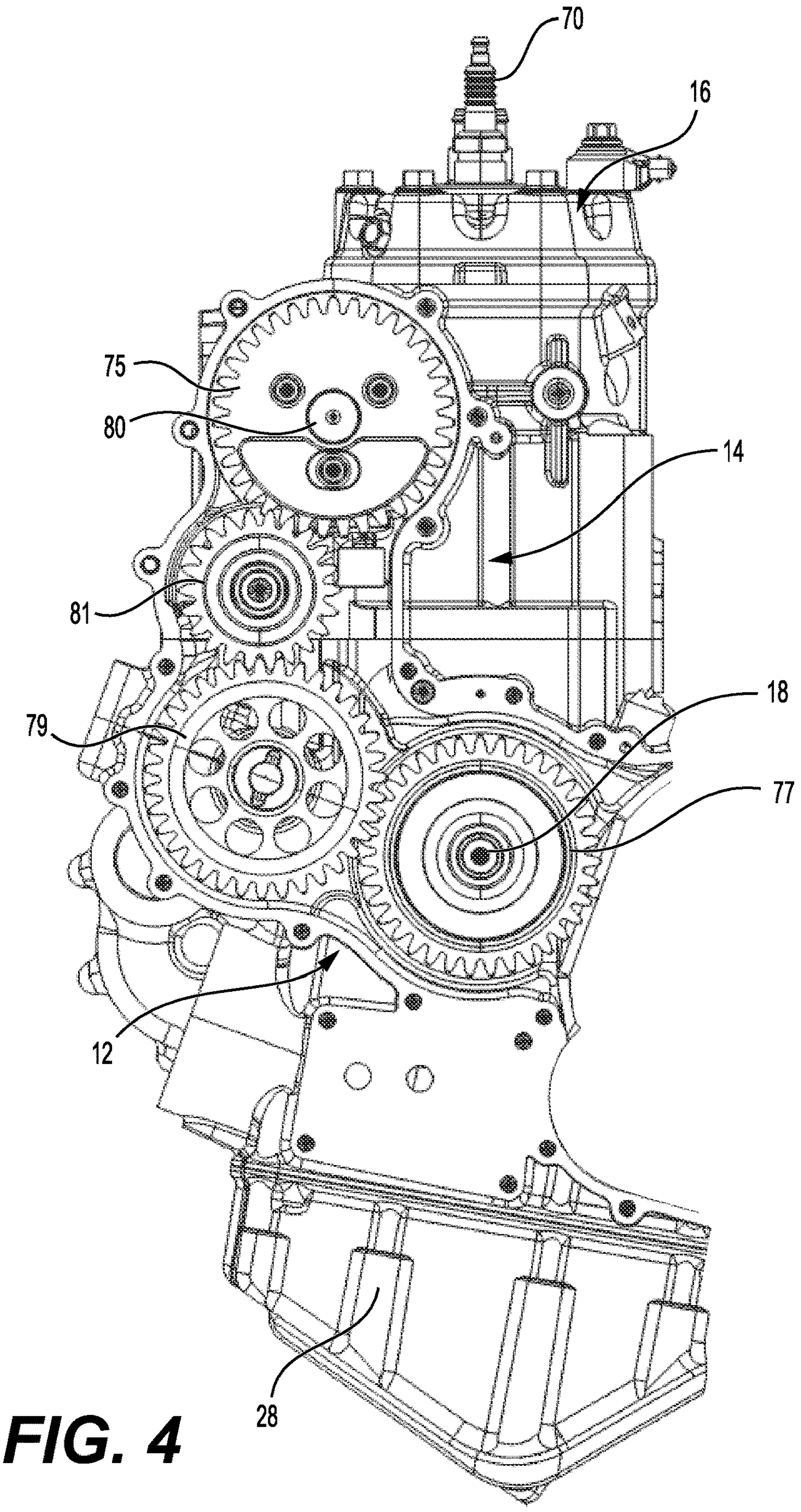
FIG. 4 is left side elevation view of the engine as shown in FIG. 3.

The exhaust valve assembly 60 is operatively connected to the crankshaft 18 such that the exhaust valve assembly 60, including the rotary valve structure 64 and the valves 82, is rotated continuously by the crankshaft 18 during operation of the engine 10. To that end, as shown in FIGS. 3 and 4, the exhaust valve assembly 60 has a drive member 75 mounted to the end portion 90 of the shaft 80. More specifically, as shown in FIGS. 11A and 12, the drive member 75 is affixed, via fasteners 118, to a flange 115 of the shaft 80 that is formed at the end portion 90 thereof. In this implementation, the drive member 75 is a gear that is driven by a gear 77 mounted to the crankshaft 18. More specifically, the gear 77 engages a gear 79 which is operatively connected to a water pump (not shown) of the engine 10 to drive the water pump. The gear 79 in turn engages an idler gear 81. The gear 75 is drivingly engaged with the idler gear 81 such that rotation of the crankshaft 18 and its associated gear 77 causes rotation of the gear 75 through the intermediary gears 79, 81. In this implementation, a transmission ratio between the gear 75 and the gear 77 is such that a rotational speed of the exhaust valve assembly 60 is equal to a rotational speed of the crankshaft 18. In some implementations, the rotational speed of the exhaust valve assembly 60 is half of the rotational speed of the crankshaft 18. This can be achieved by selecting the size and/or number of teeth of the gears 75, 77, 79, 81 resulting in the desired transmission ratio. As an even number of idler gears transmit motion from the gear 77 to the gear 75, the gear 75 rotates in a direction opposite to a direction of rotation of the gear 77. This may facilitate counterbalancing of the engine 10. The gears 75, 77, 79, 81 are enclosed by a cover member 83 (see FIG. 1).

The exhaust valve assembly 60 has a plurality of weighted members configured to counterbalance moving masses of the engine 10. In this implementation, the exhaust valve assembly 60 has two weighted members 110, 112. The weighted member 110 is mounted to the end portion 88 of the shaft 80 while the weighted member 112 is mounted to the drive member 75.

The weighted member 110 has outer and inner peripheral surfaces 114, 116 (FIG. 11A) and extends about less than half the circumference of the rotary valve structure 64. In this implementation, the weighted member 110 is affixed to the shaft 80 via a press-fit between the inner peripheral surface 116 of the weighted member 110 and the outer peripheral surface of the shaft 80. However, it is contemplated that the first weighted member 110 may be affixed to the shaft 80 in any suitable way in alternative implementations (e.g., via one or more fasteners). In this implementation, the second weighted member 112 is integrally formed with the drive member 75. As such, the weighted members 110, 112 rotate together with the rotary valve structure 64.

Figure 10:
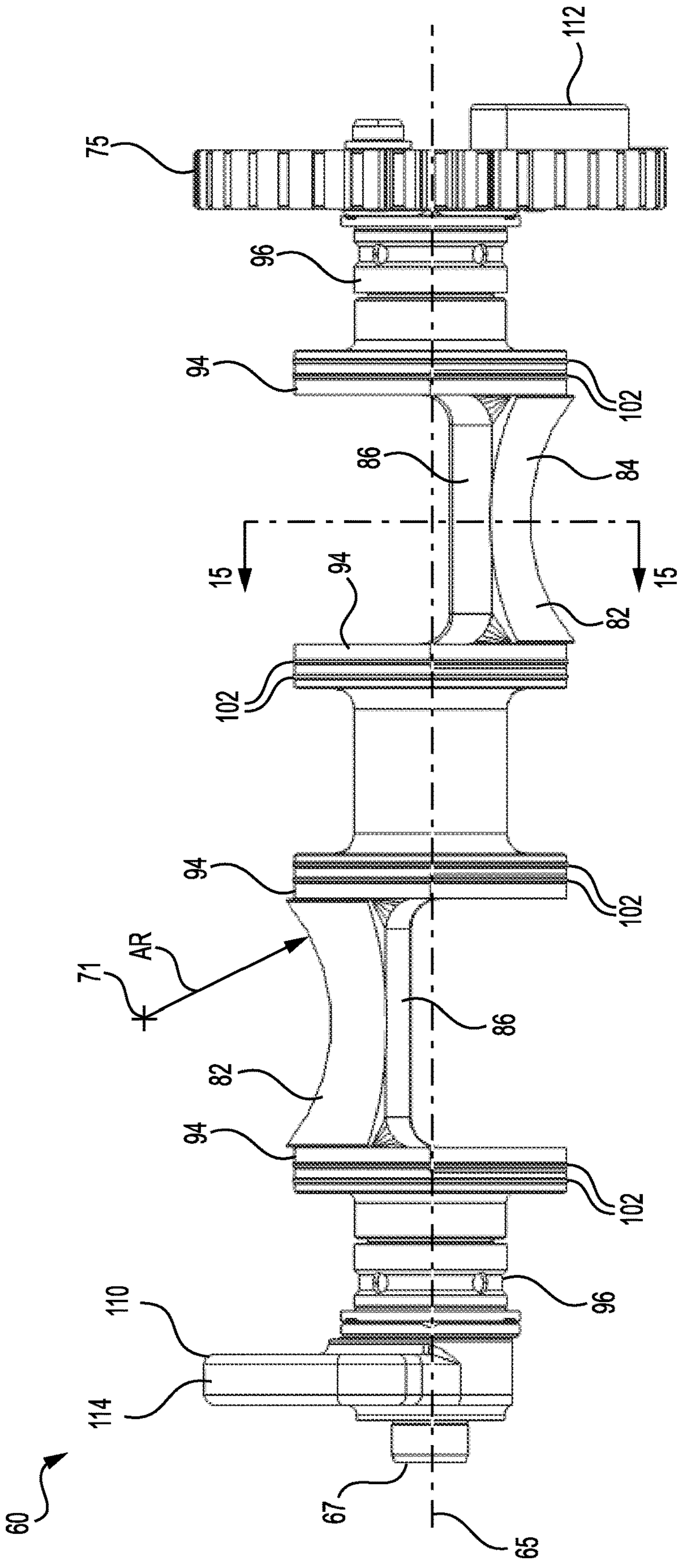
FIG. 10 is a rear elevation view of the exhaust valve assembly of FIG. 9.

In this implementation, the weighted members 110, 112 are positioned at the end portions 88, 90 of the shaft 80 and are thus significantly spaced from a center of the shaft 80. For an engine with a two cylinder configuration such as the engine 10 this may allow a mass of the weighted members 110, 112 to be reduced compared to the mass they would need to have at other positions along the shaft 80 in order to have the same counterbalancing effect. It is contemplated that, in alternative implementations, the weighted members 110, 112 could be positioned elsewhere along the shaft 80 (e.g., at the intermediate portion 92) or additional weighted members may be used (e.g., three or more weighted members). Moreover, as shown in FIG. 10, the weighted member 110 is positioned such that a majority (i.e., a majority or an entirety) of the weighted member 110 is, circumferentially, on an opposite side (i.e., an opposite circumferential half) of the central axis 65 than the weighted member 112. In particular, in this implementation, a center of gravity of the weighted member 110 is diametrically opposite a center of gravity of the weighted member 112 in a circumferential direction of the exhaust valve assembly 60. The weighted member 110 is on a same side of the central axis 65 as the valve 82 closest to the weighted member 110 while the weighted member 112 is on a same side of the central axis 65 as the valve 82 closest to the weighted member 112. The weighted member 110 is enclosed within a chamber 95 of the housing 63 that extends, axially, between the end 87 of the shaft 90 and the bearing 96 mounted to the end portion 88 of the shaft 90.

The weighted members 110, 112 and the valves 82 constitute portions of the exhaust valve assembly 60 that are asymmetric relative to the central axis 65 and may be referred to as "asymmetrically rotating masses" of the exhaust valve assembly 60. The valves 82 constitute between 45% to 55% of a total mass of the asymmetrically rotating masses of the exhaust valve assembly 60. In particular, in this implementation, the valves 82 constitute approximately 50% of the total mass of the asymmetrically rotating masses of the exhaust valve assembly 60 (i.e., ±2%). However, of the asymmetrically rotating masses of the exhaust valve assembly 60, the valves 82 contribute less than 50% to counterbalancing the exhaust valve assembly 60, notably since the masses of the valves 82 are located closer to the central axis 65 of the rotary valve structure 64 than the masses of the weighted members 110, 112.

During operation of the engine 10, gas contained in the combustion chamber defined by each cylinder 30 can sometimes leak past the pistons 34 and into the crankcase 12 of the engine 10. This gas is referred to as "blow-by gas" and can adversely affect performance of the engine 10. In addition, exhaust gases may leak from the cylinder 30 past the sealing rings 102. To address this, the exhaust valve assembly 60 has a venting system 140 configured to vent gases, including the blow-by gas.

Figure 17:
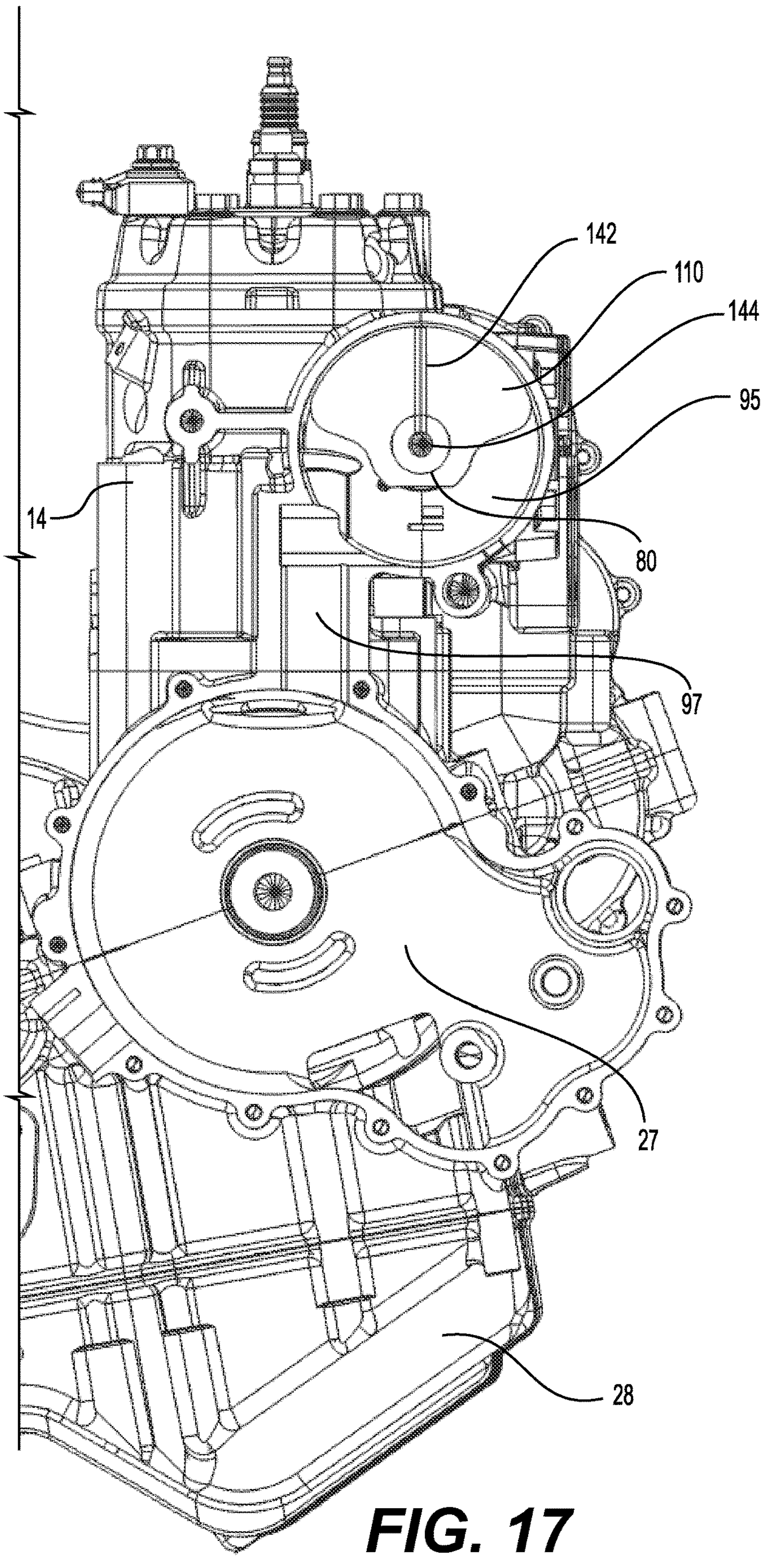
FIG. 17 is a cross-sectional view of the engine of FIG. 2 taken through line 17-17 of FIG. 2.
Figure 18:
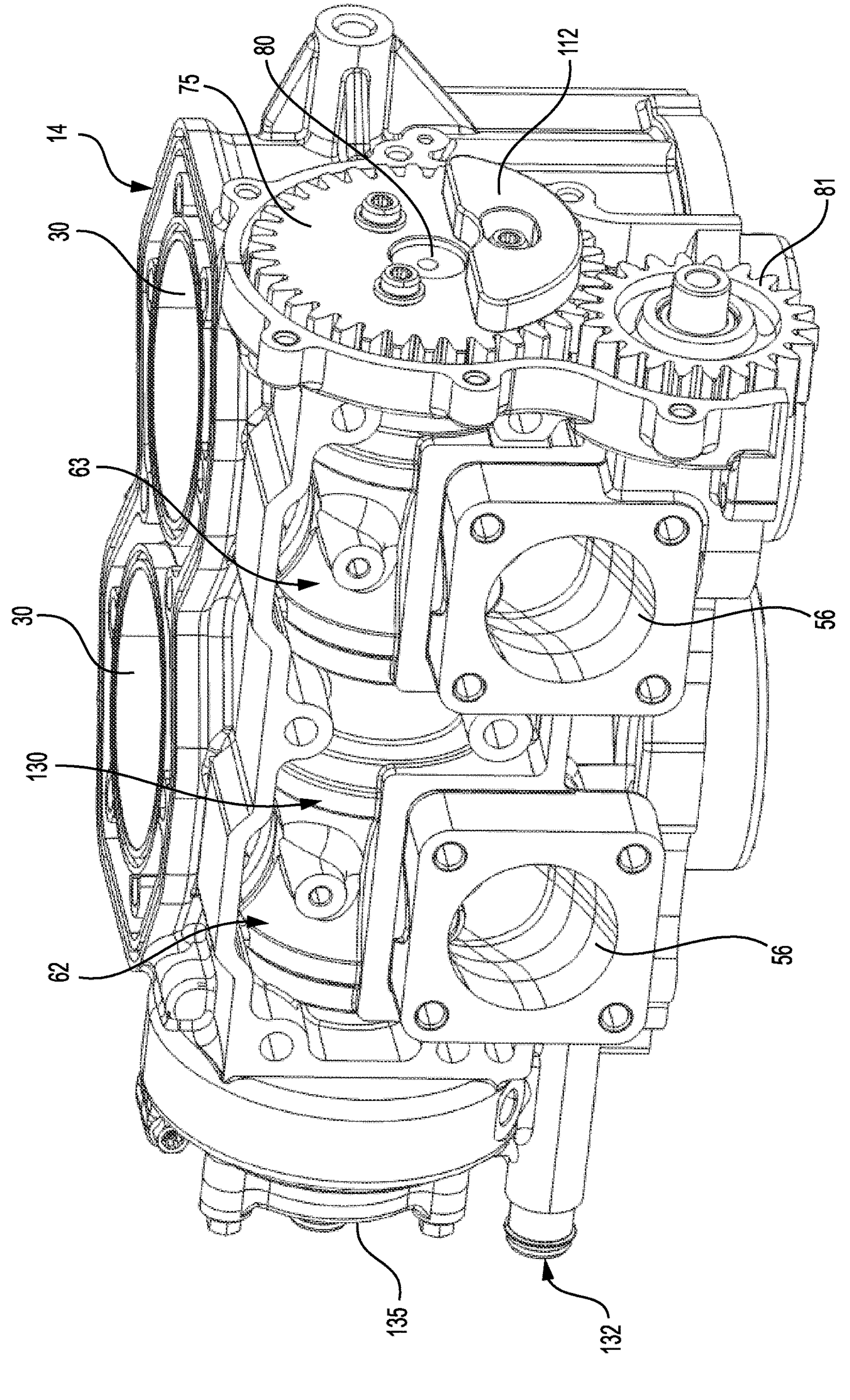
FIG. 18 is a front perspective view of the components of FIG. 5 with a casing removed to expose a valve cooling jacket.
Figure 19:
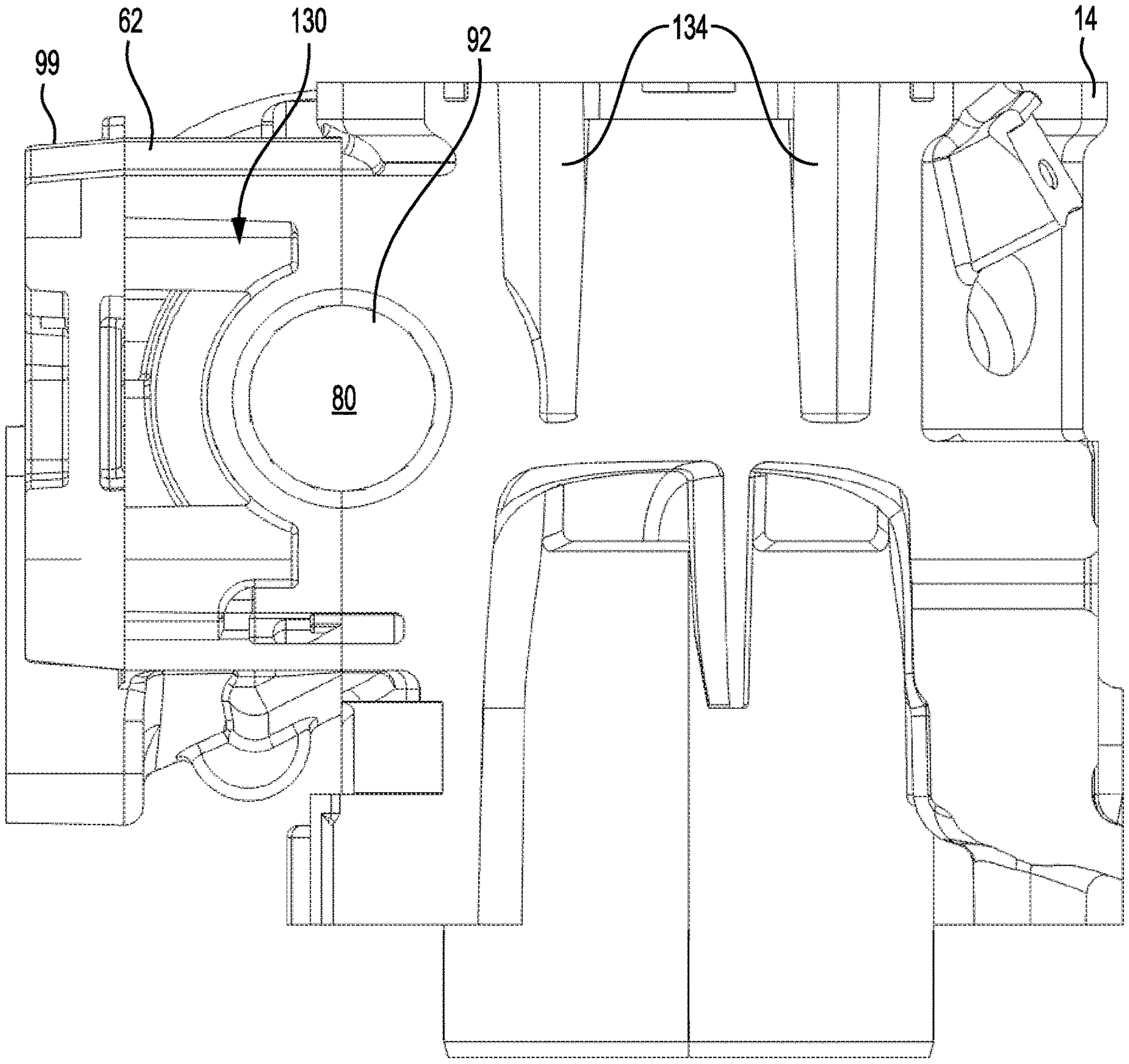
FIG. 19 is a cross-sectional view of the engine of FIG. 2 taken through line 19-19 of FIG. 2.

The venting system 140 of the exhaust valve assembly 60 is defined by the weighted member 110 and the shaft 80 which collaborate together to vent the blow-by gas. As such, at least a portion of the venting system 140 is integrated in the shaft 80. More specifically, with reference to FIG. 11A, the weighted member 110 has a radial bore 142 that extends radially from the outer peripheral surface 114 to the inner peripheral surface 116 of the weighted member 110. The shaft 80 has an axial bore 144 that extends axially from the end 87 of the shaft 80 along the end portion 88 of the shaft 80. The shaft 80 also has, at its end portion 88, a radial bore 146 extending from the outer surface of the shaft 80 to the axial bore 144. The weighted member 110 is mounted to the shaft 80 such that the radial bore 142 of the weighted member 110 is aligned with the radial bore 146 of the shaft 80. The radial bore 142 is thus in fluid communication with the axial bore 144 through the radial bore 146. During operation of the engine 10, the blow-by gas circulates from the crankcase 12 to the chamber 95 enclosing the weighted member 110. More specifically, in this implementation, the blow-by gas travels from the crankcase 12 to the oil reservoir 28 and then makes its way to the generator housing 27 which is connected to the oil reservoir 28. As shown in FIG. 17, the generator housing 27 is connected to the chamber 95 via a channel 97. The blow-by gas thus enters the chamber 95 through the channel 97. The blow-by gas fills the chamber 95 evenly and then enters the radial bore 142 of the weighted member 110 and, through the radial bore 146 of the shaft 80, subsequently enters the axial bore 144 of the shaft 80. From there, the blow-by gas exits the axial bore 144 through the end 87 of the shaft 80. The axial bore 144 is in fluid communication with the bore 141 of the cover 135 enclosing the end 87 of the shaft 80 such that the blow-by gas is vented out of the engine 10 through the bore 141 of the cover 135. From the bore 141, the blow-by gas flows inside a pipe (not shown) to the air intake system (not shown) of the engine 10. Exhaust gases which have leaked from the cylinder 30 past the sealing rings 102 may also be received in the chamber 95 and are vented therefrom in a similar manner to the blow-by gas (i.e., through the bores 142, 146, 144, 141).

The chamber 95 defined by the housing 63 also receives lubricant (e.g., oil) therein. Notably, lubricant used to lubricate the nearest bearing 96 flows radially from the bearing 96 toward the nearest web portion 94 and into an annular groove 150 defined by the housing 63. In particular, part of the annular groove 150 is defined by the cylinder block 14 and a complimentary part of the annular groove 150 is defined by the cover member 62. From the annular groove 150, the lubricant travels axially through a channel 152 defined by the housing 63 to the chamber 95. As the weighted member 110 rotates together with the rotary valve structure 64, the centrifugal forces generated by the weighted member 110 prevent the lubricant from entering the radial bore 142. The lubricant is thus collected in the chamber 95, enters the channel 97, flows into the generator housing 27 and subsequently into the oil reservoir 28.

With reference to FIGS. 18 to 21, the engine 10 has a valve cooling jacket 130 configured to cool the exhaust valve assembly 60. The cooling jacket 130 is defined between the cover member 62 and a casing 99 (which, in FIG. 18, has been removed to expose the cooling jacket 130, but is shown in FIG. 5) that is selectively detachable from the cover member 62. It is contemplated that the casing 99 could be integrated with the cover member 62 in alternative implementations. An inlet 132 is fluidly connected to the cooling jacket 130 and is configured to be connected to a coolant source to supply coolant to the cooling jacket 130. In particular, the inlet 132 is connected to a plurality of openings in a bottom of the cover member 62 through which the coolant enters the cooling jacket 130.

Heat is transferred from various components of the exhaust valve assembly 60 to the cooling jacket 130. For instance, heat is transferred from the bearings 96 to the cover member 62 which in turn transfers the heat to the cooling jacket 130. In a similar manner, heat is transferred from the sealing rings 102 to the cover member 62 and to the cooling jacket 130.

Figure 13:
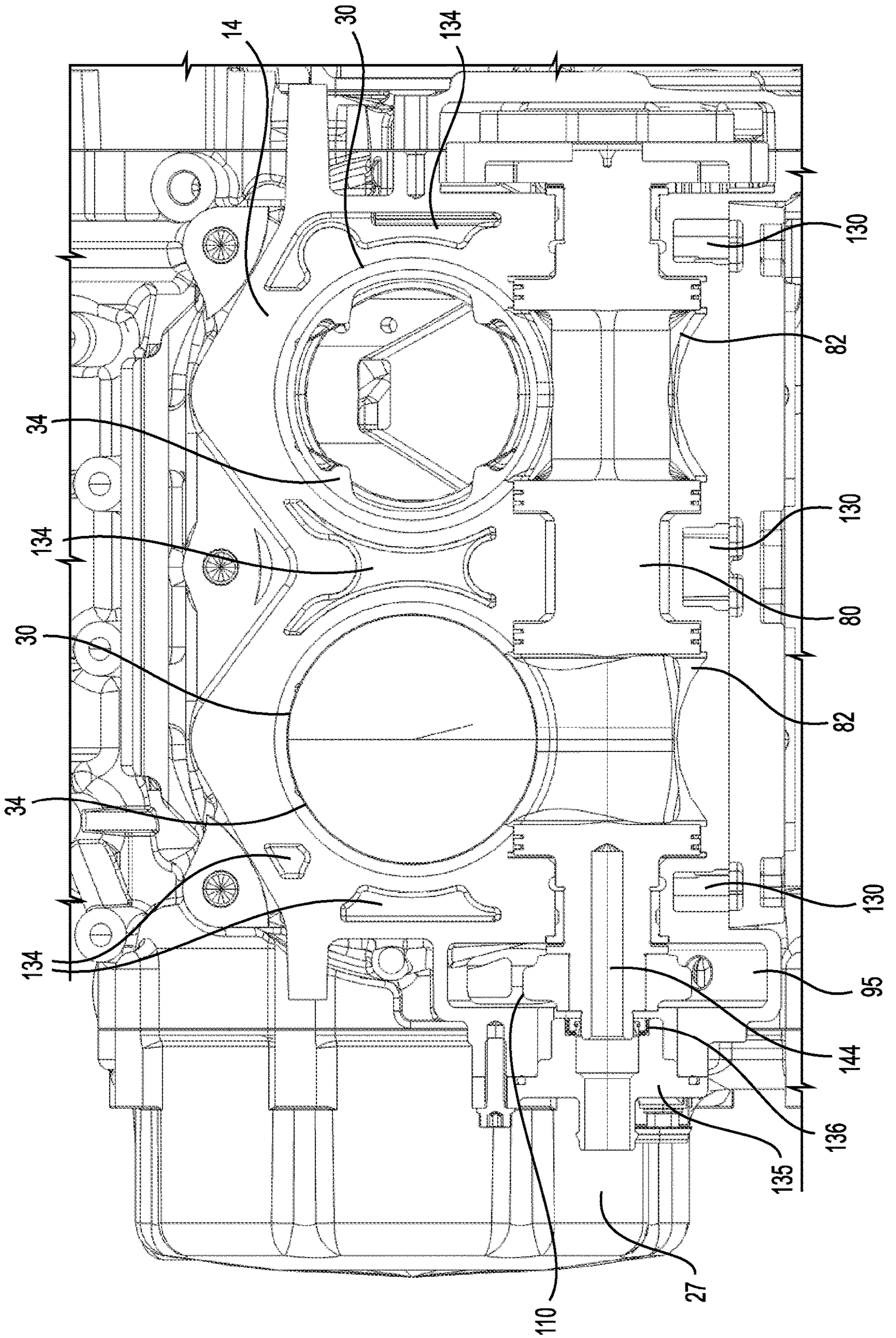
FIG. 13 is a cross-sectional view of the engine of FIG. 2 taken through line 13-13 of FIG. 2.
Figure 20:
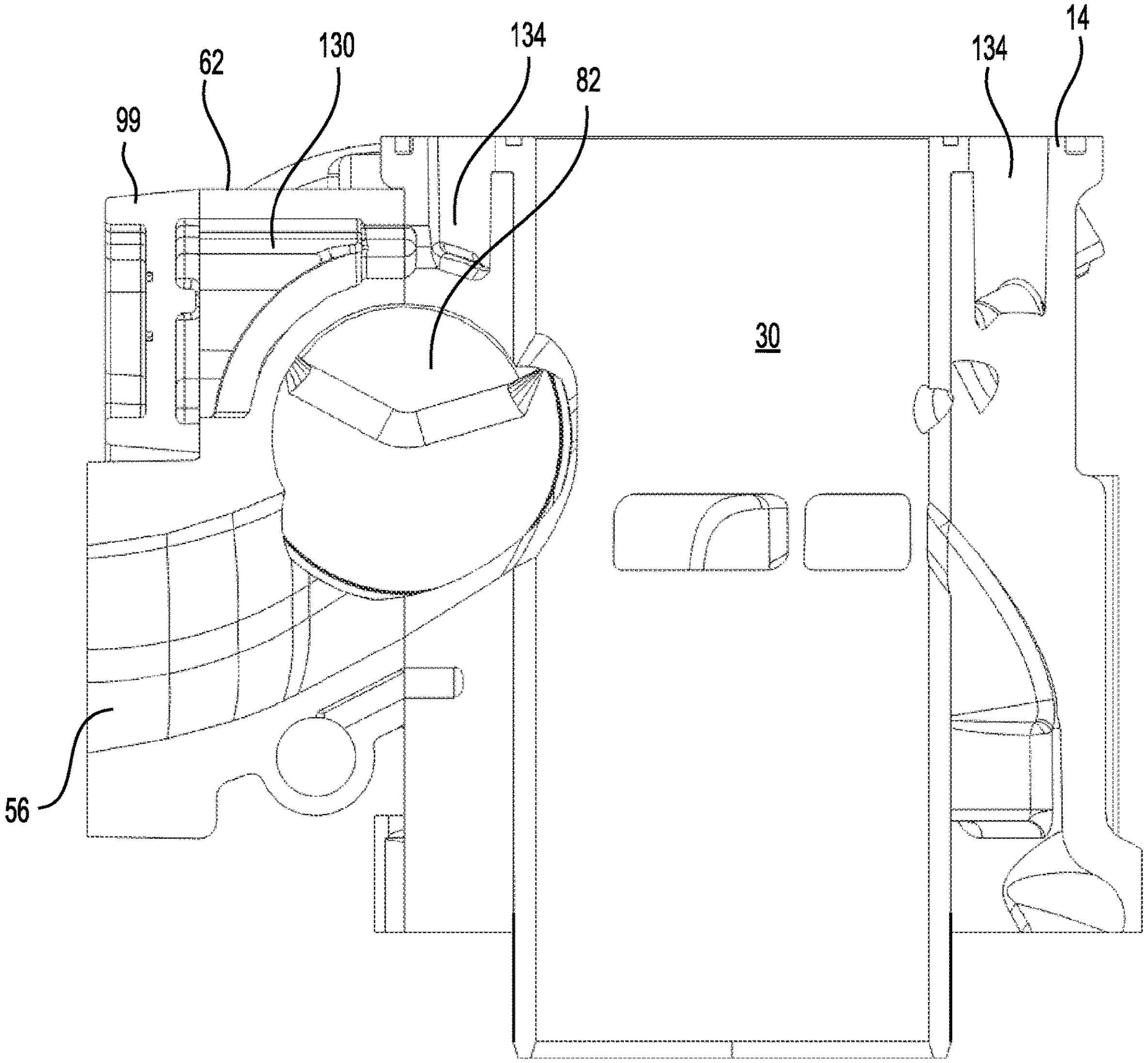
FIG. 20 is a cross-sectional view of the engine of FIG. 2 taken through line 20-20 of FIG. 2.
Figure 21:
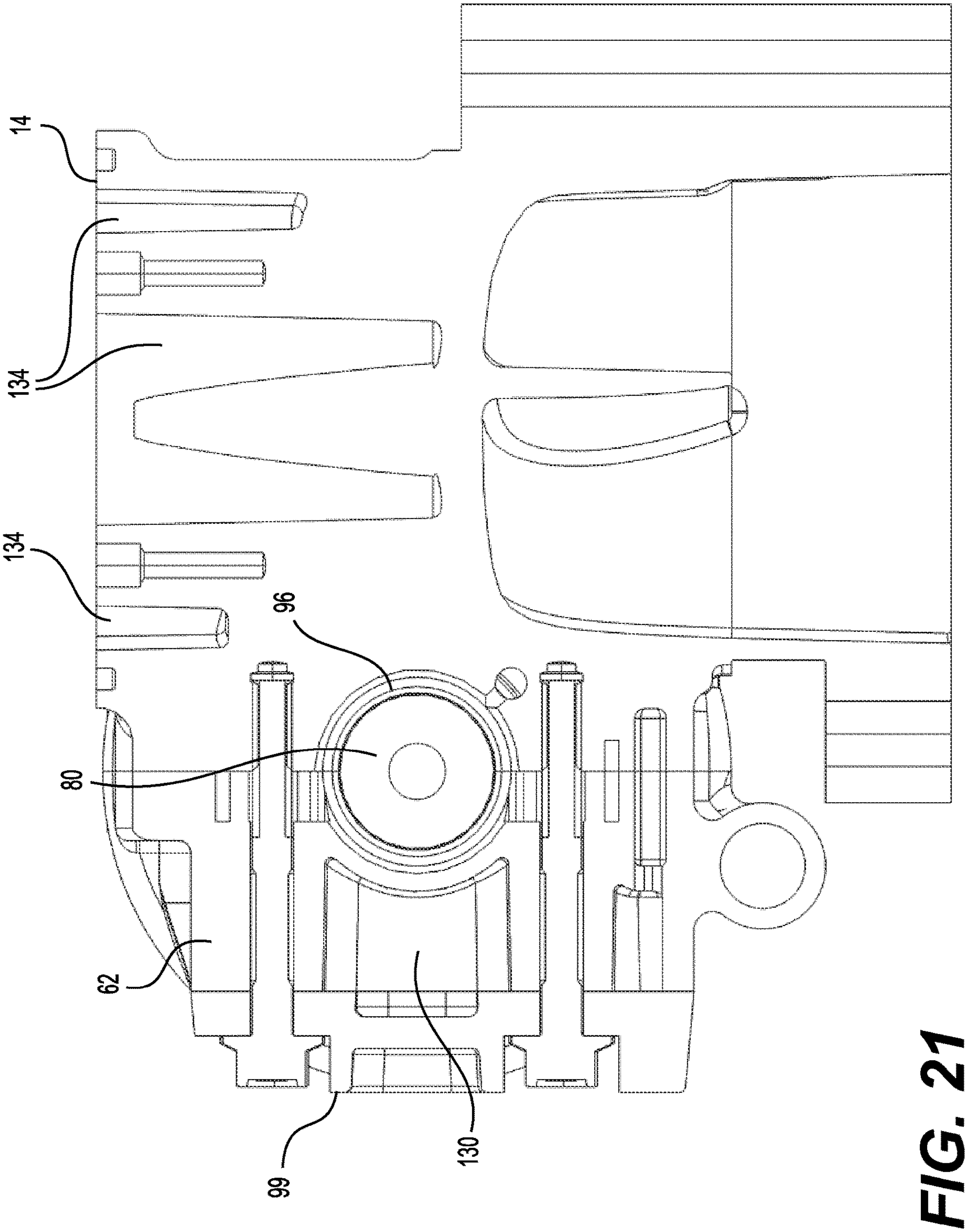
FIG. 21 is a cross-sectional view of the engine of FIG. 2 taken through line 21-21 of FIG. 2.

In this implementation, as shown in FIG. 20, the valve cooling jacket 130 is fluidly connected to a cylinder cooling jacket 134 defined by the cylinder block 14. As such, the coolant entering the inlet 132 is circulated through the valve cooling jacket 130 and then through the cylinder cooling jacket 134. The cylinder cooling jacket 134 extends between the cylinders 30 and at each side of the cylinders 30, as shown in FIG. 13. Moreover, as shown in FIG. 5, at an upper portion of the cylinder block 14, the cooling jacket 134 extends around and thus surrounds each cylinder 30. The valve cooling jacket 130 and the cylinder cooling jacket 134 thus define a continuous cooling jacket in which the coolant circulates to absorb heat from the engine 10. From the cylinder cooling jacket 134, the coolant flows through a heat exchanger (not shown) and is returned to the coolant source, such as a coolant tank. It is contemplated that the coolant, or only a part thereof, may flow trough other cooling jackets of the engine 10 to cool other components of the engine 10 prior to flowing to the heat exchanger.

Figure 24:
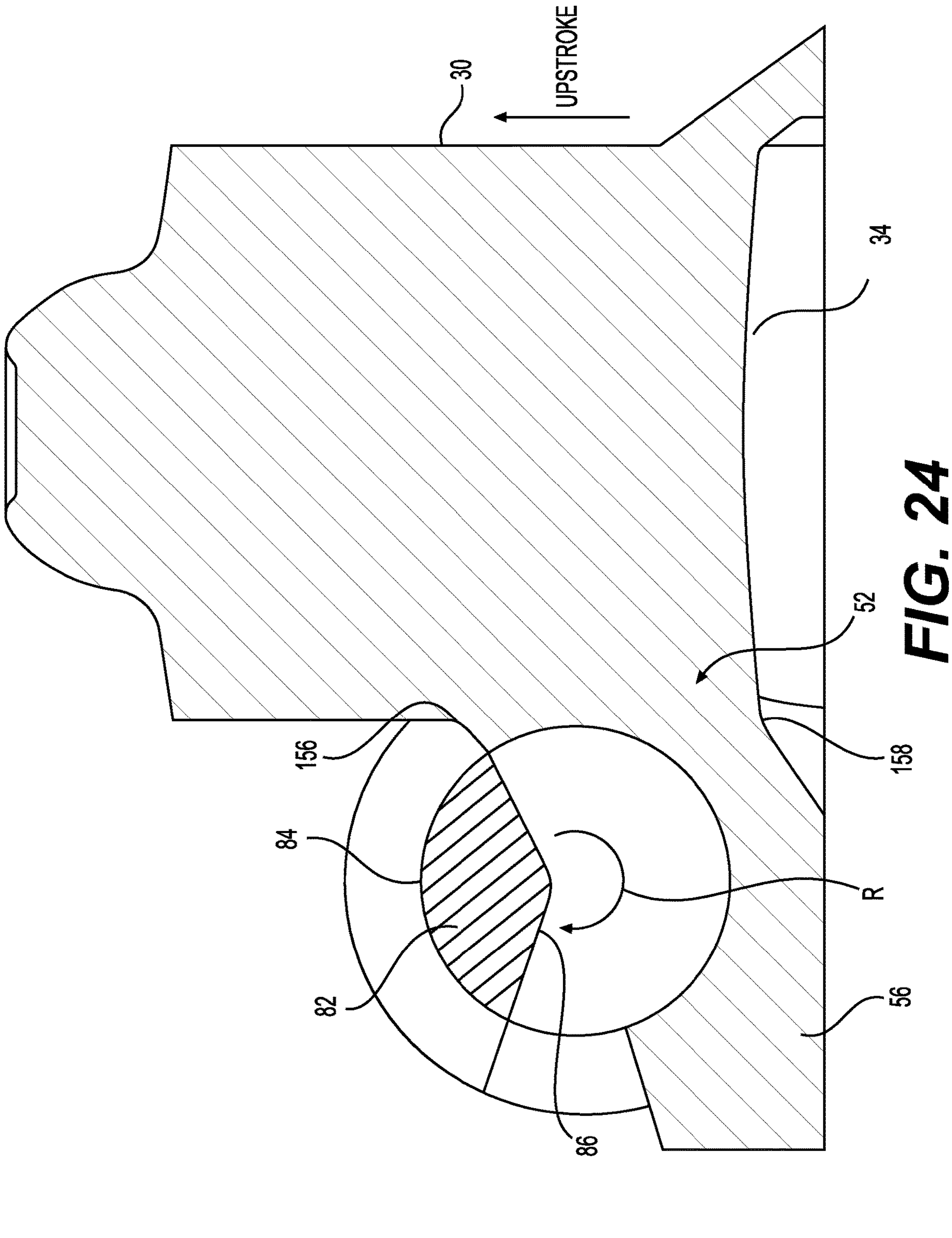
Figure 25:
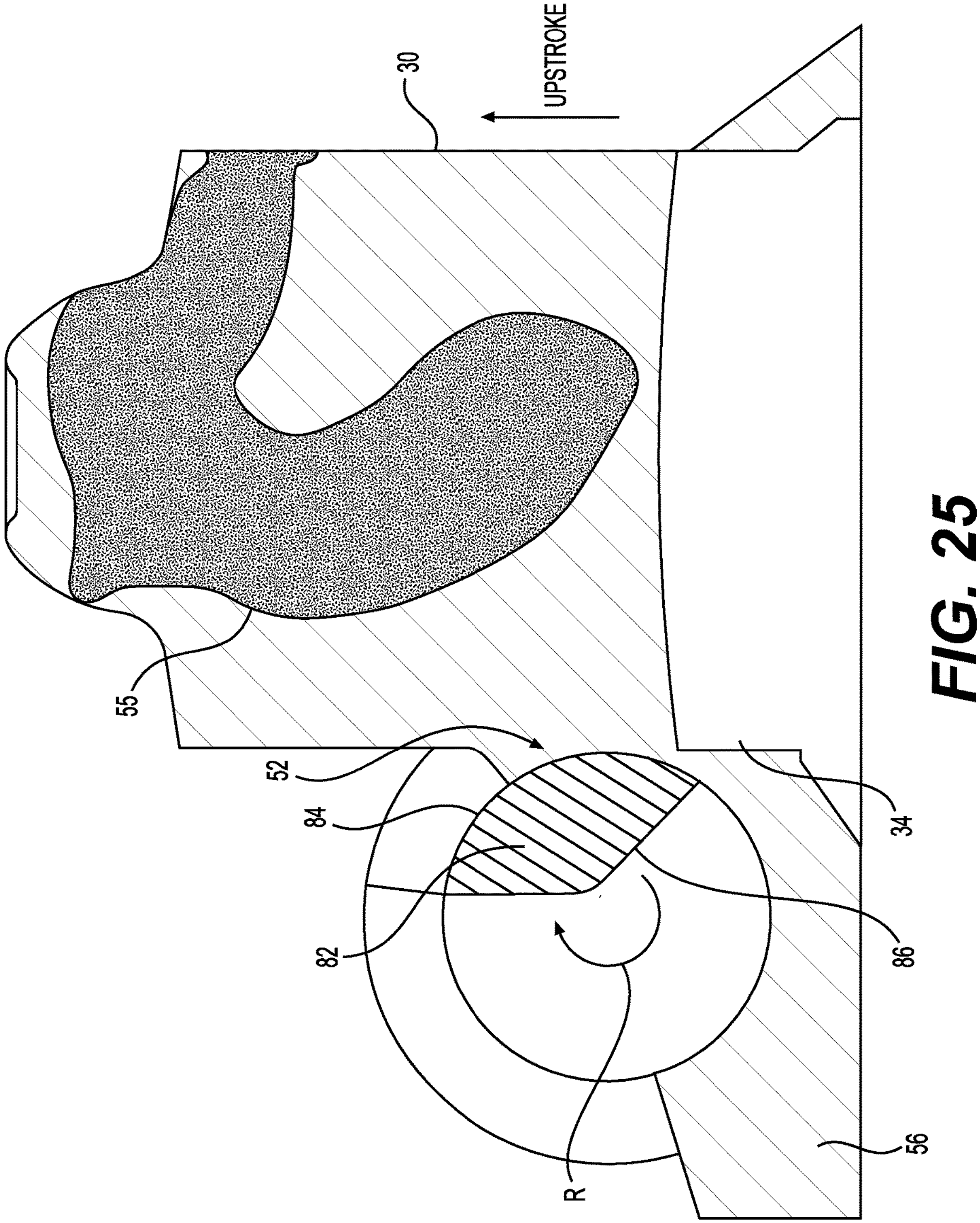
Figure 26:
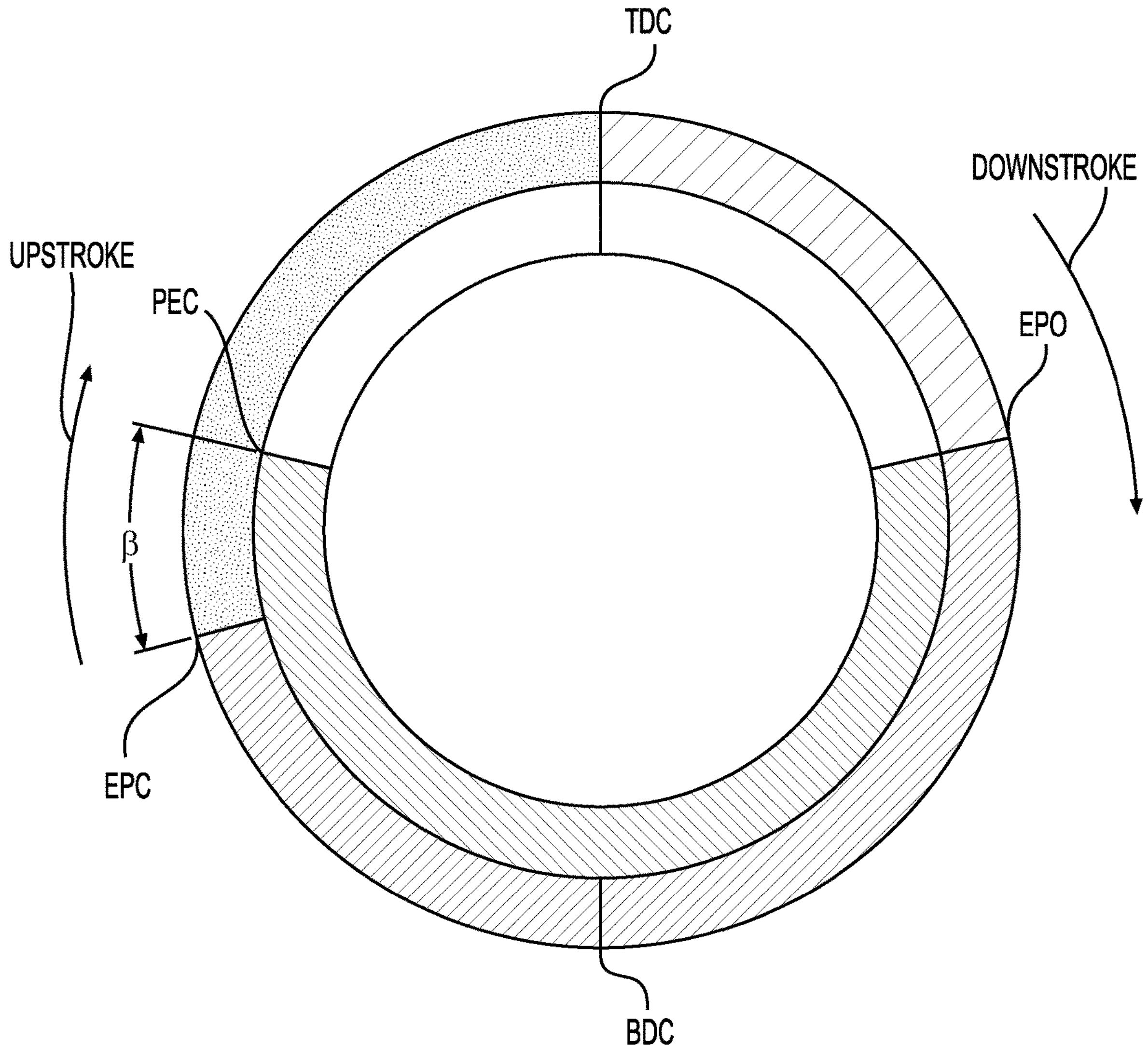
FIG. 26 is a timing diagram detailing the state of an exhaust port of a given one of the cylinders relative to the position of the corresponding piston and the valve of the exhaust valve assembly.

The operation of the engine 10, including motion of the pistons 34 and the associated motion of the exhaust valve assembly 60, will now be explained in more detail with reference to FIGS. 22 to 26. FIG. 26 is a timing diagram detailing the state of the exhaust port 52 of a given one of the cylinders 30 relative to the position of the corresponding piston 34 and valve 82. The outer ring of the diagram is representative of the state of the exhaust port 52 as a whole as affected by the piston 34 and the exhaust valve assembly 60. The inner ring of the diagram is representative of the state of the exhaust port 52 as affected by the piston 34. It is understood that the same timing diagram applies to the other piston 34 and cylinder 30 (albeit the respective timings of the pistons 34 are offset from one another by) 180°.

Figure 22:
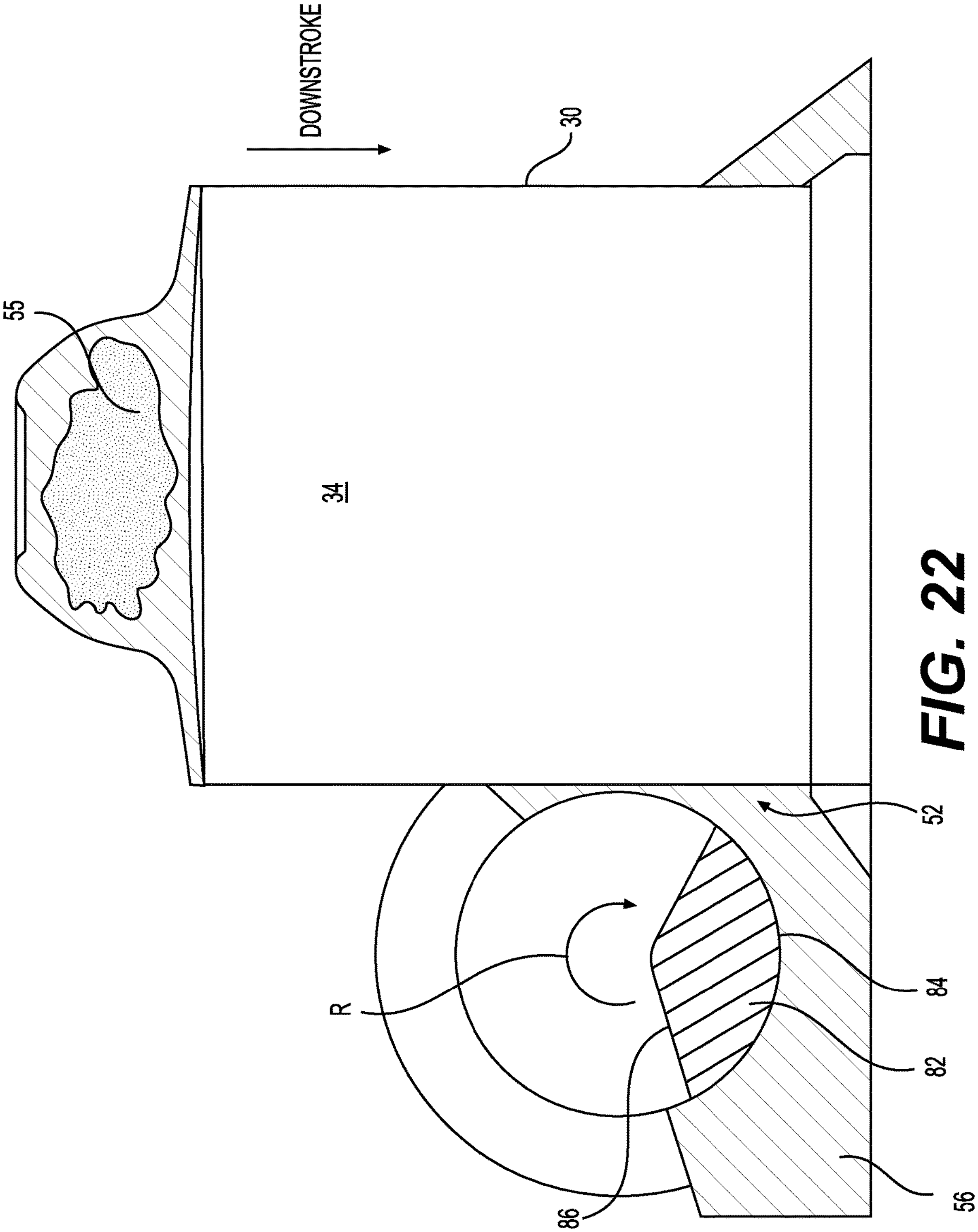
FIGS. 22 to 25 are cross-sectional views of part of the engine of FIG. 1 showing a piston thereof at different positions of its reciprocal motion and a valve of the exhaust valve assembly at corresponding positions.
Figure 23:
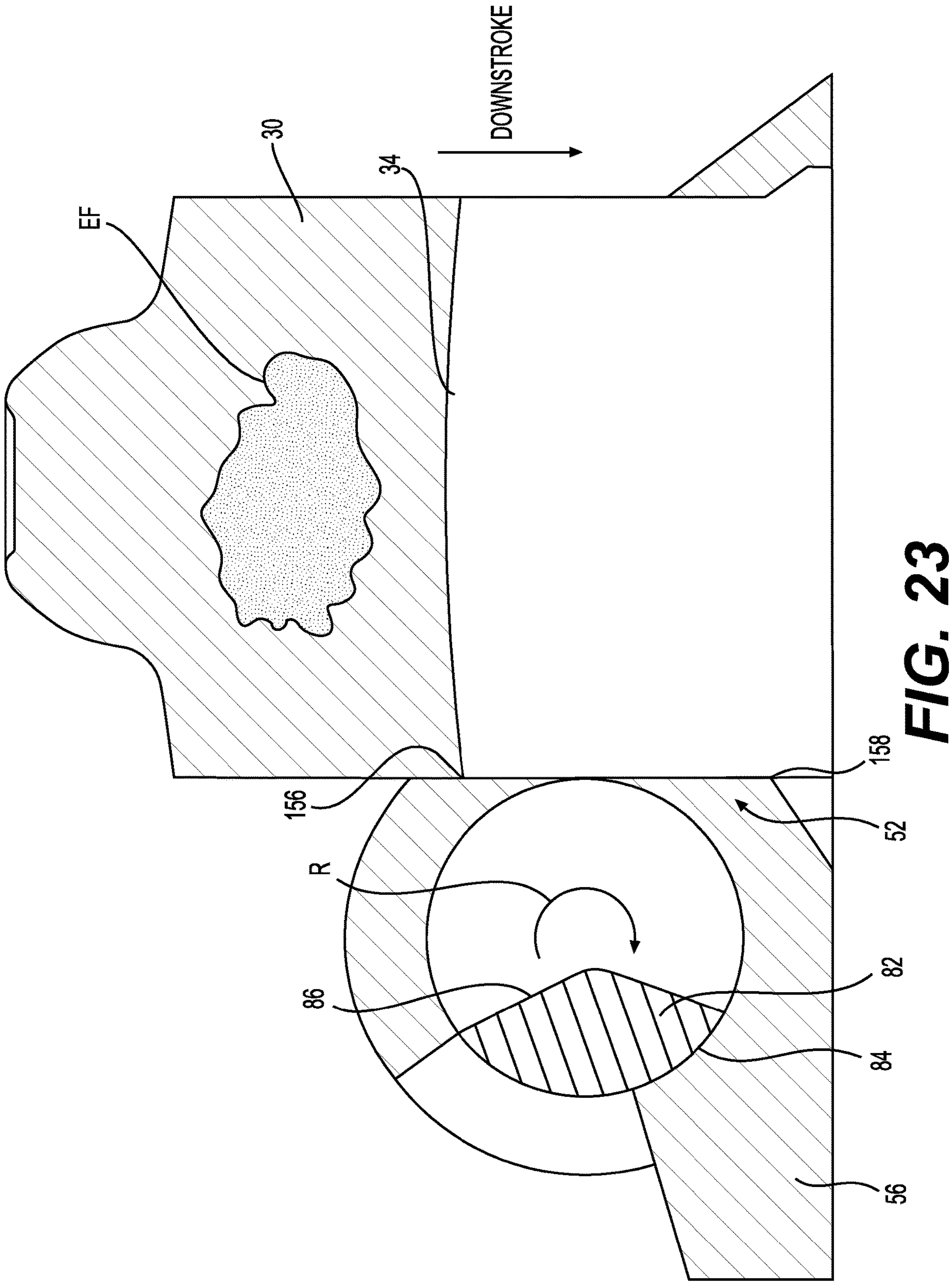

At a top dead center (TDC) position of the piston 34, as shown in FIG. 22 and schematically designated in the diagram of FIG. 26, the piston 34 is at its maximum upper (compression) position within the cylinder 30. At this point, an air-fuel mixture 55 contained in the combustion chamber is combusted which causes the downstroke of the piston 34. Since the exhaust valve assembly 60 is rotatably driven, through its drive member 75, by the rotation of the crankshaft 18 (which itself is driven by the reciprocal motion of the piston 34), the valve 82 rotates synchronously with the motion of the piston 34, as represented by the arrow R. In this implementation, as will be noted from FIG. 22, during the downstroke of the piston 34, the valve 82 rotates downward in line with the direction of motion of the piston 34. As the piston 34 begins its downstroke, the piston 34 uncovers the exhaust port 52 of the cylinder 30 at a point EPO (i.e. exhaust port opening) which is schematically designated in FIG. 26. As shown in FIG. 23, at the point EPO which occurs during the downstroke of the piston 34, before the piston 34 uncovers the exhaust port 52, the valve 82 moves clear of the exhaust port 52. In other words, at the point EPO, the rotational position of the valve 82 is such that the valve 82 does not interfere with the exhaust port 52. That is, at the instant of the rotation of the valve 82 corresponding to the point EPO, the valve 82 is positioned such that the outer surface 84 of the valve 82 faces away from the cylinder 30 and thus allows the flow of fluids through the exhaust port 52. Thus, as the piston 34 begins to uncover the exhaust port 52 during the downstroke, the exhaust fluids EF are allowed to flow through the exhaust port 52 since both the piston 34 and the valve 82 at least partially clear the exhaust port 52 (i.e., a portion of the exhaust port 52 is uncovered by both the piston 34 and the valve 82). In other words, as the piston 34 moves toward its bottom dead center (BDC) position (its lowest position within the cylinder 30) from an upper edge 156 of the exhaust port 52, the valve 82 does not obstruct a space between the upper edge 156 of the exhaust port 52 and the piston 34.

As described above, as the exhaust fluids EF pass through the exhaust port 52, the exhaust fluids EF interact with the inner surface 86 of the valve 82 which, due to the configuration of the inner surface 86, can improve the flow of the exhaust fluids EF through the exhaust passage 56 compared to other configurations.

Once the piston 34 reaches its BDC position (shown in FIG. 24 and schematically designated in FIG. 26), the piston 34 begins its upstroke. During the upstroke of the piston 34, the valve 82 rotates downward opposite the direction of motion of the piston 34. As such, as shown in FIG. 24, during the upstroke of the piston 34, the valve 82 moves downward from the upper edge 156 of the exhaust port 52 to interfere with the flow of fluids while the piston 34 moves upward from a lower edge 158 of the exhaust port 52 to interfere with the flow of fluids. As such, the valve 82 closes the exhaust port 52 by moving from the upper edge 156 to the lower edge 158 of the exhaust port 52. In particular, with reference to FIG. 25, as the piston 34 begins its upstroke and the exhaust port 52 is partially covered by the piston 34, the air-fuel mixture 55 enters the combustion chamber. However, at the point designated as EPC (i.e. exhaust port closing) in FIG. 26, which occurs during the upstroke of the piston 34, the rotational position of the valve 82 is such that the valve 82 at least partially closes the exhaust port 52 to prevent the flow of fluids through the exhaust port 52. That is, at the instant of the rotation of the valve 82 corresponding to the point EPC, the outer surface 84 of the valve 82 faces the cylinder 30 and covers the portion of the exhaust port 52 that is not covered by the piston 34 to prevent the air-fuel mixture 55 from passing through the exhaust port 52. In other words, as the piston 34 moves toward its TDC position, the piston 34 and the valve 82 close the exhaust port 52 together before the piston 34 reaches the upper edge 156 of the exhaust port 52. As such, at the point EPC, the exhaust port 52 is closed despite the fact that the piston 34 is not fully covering the exhaust port 52. This is in contrast to a corresponding two-stroke engine not having exhaust valves 82 where, at this position of the piston, part of the air-fuel mixture could be expelled through the exhaust port of the cylinder resulting in a loss of fuel. Compression of the air-fuel mixture 55 by the piston 34 begins at this stage, which is sooner than in a corresponding two-stroke engine not having exhaust valves 82.

At point PEC (i.e. piston exhaust port closing), the piston 34 covers an entirety of the exhaust port 52 on its own (i.e., independently of the valve 82). The piston 34 then reaches the TDC position and the cycle restarts.

As will be noted from the diagram of FIG. 26, the exhaust port 52 of the cylinder 30 remains open longer during the downstroke of the piston 34 (i.e. from EPO to BDC) than during the upstroke of the piston 34 (i.e. from BDC to EPC). Moreover, during the upstroke of the piston 34, the exhaust port 52 is closed before the piston 34 fully covers the exhaust port 52 by an angular distance β. The angular distance may β be at least 20°, in some cases at least 25° and in some cases even more. In one implementation, the angular distance β is between 25° and 30°. During one cycle of the reciprocal motion of the piston 34, the exhaust port 52 remains open for an angular distance (measured between points EPO and EPC) of at least 150°, in some cases at least 160°, in some cases at least 170°, in some cases at least 175° and in some cases even more. In this implementation, the angular distance between the points EPO and EPC is between 175° and 180°.

The rotary motion of the valves 82 with respect to the rotary motion of the crankshaft 18 is such that the masses associated with the valves 82 at least partially counterbalance rotating masses of the crankshaft 18. In other words, the position of the valves 82 with respect to their respective pistons 34 is such that the masses of the valves 82 at least partially counterbalance the rotating masses of the crankshaft 18. For example, as shown in FIG. 22, at the TDC position of the piston 34, the outer surface 84 of the corresponding valve 82 faces generally downward (i.e., toward a direction of motion of the piston 34 during its downstroke). As shown in FIG. 23, at the point EPO, at the moment the piston 34 uncovers the exhaust port 52 (i.e., clears the upper edge 156), the outer surface 84 of the valve 82 faces generally rearward. At the BDC position of the piston 34, as shown in FIG. 24, the outer surface 84 of the valve 82 faces generally upward (i.e., toward a direction of motion of the piston 34 during its upstroke). At the point EPC, as shown in FIG. 25, the outer surface 84 of the valve 82 faces generally frontward. In this context, the outer surface 84 is said to face a particular direction when a center of the outer surface 84 bisecting the circumferential span of the valve 82 faces that particular direction.

Figure 27:
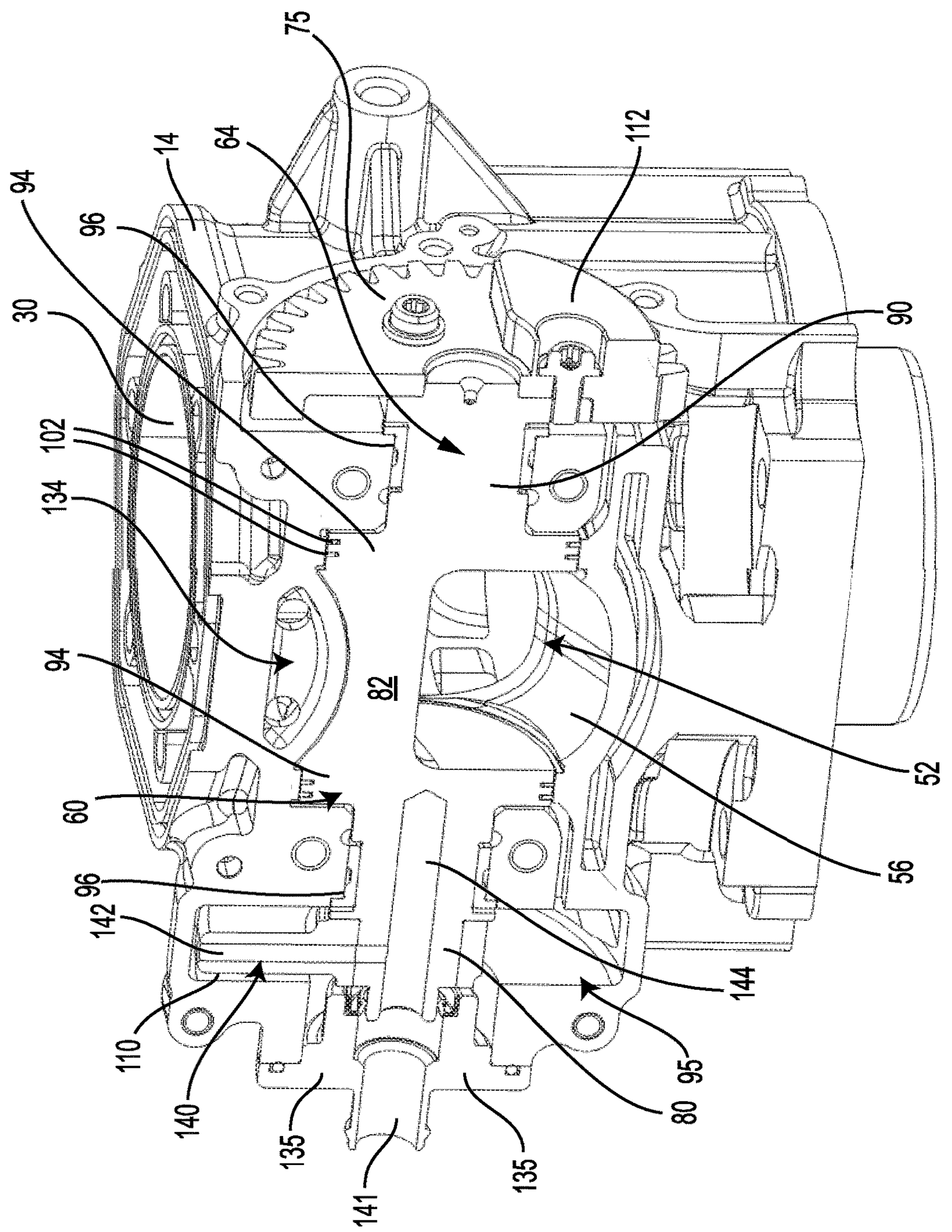
FIG. 27 is a cross-sectional view of the cylinder block of an engine according to an alternative implementation in which the engine has a single cylinder.

While the exhaust valve assembly 60 described in this implementation is configured for use on an internal combustion engine with multiple cylinders, the exhaust valve assembly 60 may be configured for use with an internal combustion engine with a single cylinder in alternative implementations. For instance, FIG. 27 illustrates such an implementation in which similar parts have been numbered with the same reference numbers. In such an implementation, the shaft 80 does not have the intermediate portion 92 and the rotary valve structure 64 has a single valve 82.

Modifications and improvements to the above-described implementations of the present technology may become apparent to those skilled in the art. The foregoing description is intended to be exemplary rather than limiting. The scope of the present technology is therefore intended to be limited solely by the scope of the appended claims.

What is claimed is:

1. A method of operating an exhaust valve of a two-stroke internal combustion engine, an exhaust valve assembly of the two-stroke engine including the exhaust valve and a weighted member, the exhaust valve and the weighted member being disposed on a same side of an axis of rotation of the exhaust valve, the engine comprising a cylinder and a piston movably disposed within the cylinder, the piston being movable along a cylinder axis of the cylinder in a reciprocating motion including an upstroke and a downstroke, the cylinder defining at least one exhaust port for discharging exhaust fluid from the cylinder, the exhaust valve being configured to cyclically obstruct the exhaust port, the method comprising:

rotating the exhaust valve in a first direction for clearing the exhaust port before the piston uncovers the exhaust port during the downstroke of the piston, the first direction being opposite a direction of rotation of a crankshaft of the engine; and rotating the exhaust valve in the first direction for at least partially closing the exhaust port before the piston fully covers the exhaust port during the upstroke of the piston, said rotating of the exhaust valve and corresponding rotation of the weighted member relative to the rotation of the crankshaft at least partially counterbalancing the crankshaft.

2. The method of claim 1, wherein the exhaust valve closes the exhaust port from an upper edge of the exhaust port toward a lower edge of the exhaust port.

3. The method of claim 1, wherein the exhaust valve is continuously rotating during operation of the engine.

4. The method of claim 1, wherein a rotational speed of the exhaust valve is equal to a rotational speed of the crankshaft.

5. The method of claim 1, wherein a rotational speed of the exhaust valve is half of a rotational speed of the crankshaft.

* * * * *